US012666296B2

(12) United States Patent
Jeon et al.

(10) Patent No.: US 12,666,296 B2
(45) Date of Patent: Jun. 23, 2026

(54) CHANNEL STATE INFORMATION MEASUREMENT AND REPORTING WITH NETWORK ADAPTATION

(71) Applicant: Samsung Electronics Co., Ltd., Suwon-si (KR)

(72) Inventors: Jeongho Jeon, San Jose, CA (US); Aristides Papasakellariou, Houston, TX (US); Hongbo Si, Allen, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 233 days.

(21) Appl. No.: 18/434,531

(22) Filed: Feb. 6, 2024

(65) Prior Publication Data

US 2024/0284223 A1      Aug. 22, 2024

Related U.S. Application Data

(60) Provisional application No. 63/456,905, filed on Apr. 4, 2023, provisional application No. 63/446,232, filed on Feb. 16, 2023.

(51) Int. Cl.
| | |
|---|---|
| *H04W 24/10* | (2009.01) |
| *H04B 7/06* | (2006.01) |
| *H04L 5/00* | (2006.01) |
| *H04W 72/20* | (2023.01) |

(52) U.S. Cl.
CPC .......... *H04W 24/10* (2013.01); *H04B 7/0626* (2013.01); *H04L 5/0051* (2013.01); *H04W 72/20* (2023.01)

(58) Field of Classification Search
CPC .... H04W 24/10; H04W 72/20; H04B 7/0626; H04L 5/0051
See application file for complete search history.

(56) References Cited

U.S. PATENT DOCUMENTS

| | | |
|---|---|---|
| 2019/0058517 A1 | 2/2019 | Kang et al. |
| 2019/0296805 A1 | 9/2019 | Son |

(Continued)

FOREIGN PATENT DOCUMENTS

| | | |
|---|---|---|
| EP | 3484057 A1 | 5/2019 |
| EP | 4120582 A1 | 1/2023 |

(Continued)

OTHER PUBLICATIONS

International Search Report and Written Opinion issued May 29, 2024 regarding International Application No. PCT/KR2024/002121, 7 pages.

(Continued)

*Primary Examiner* — Melvin C Marcelo

(57)      ABSTRACT

Methods and apparatuses for channel state information (CSI) measurement and reporting with network adaptation. A method for a user equipment (UE) includes receiving first information related to reception of one or more non-zero power CSI reference signals (NZP CSI-RSs) on a cell, second information related to determining a CSI report, third information related to indicating a second number CSI sub-reports from the first number of CSI sub-reports, fourth information related to an uplink (UL) channel for transmitting the CSI report, and the one or more NZP CSI-RSs. The method further includes determining the second number of CSI sub-reports and a third number of CSI sub-reports from the second number of CSI sub-reports based on the fourth information. The method further includes transmitting the UL channel with the CSI report including the third number of CSI sub-reports.

20 Claims, 15 Drawing Sheets

(56)         References Cited

U.S. PATENT DOCUMENTS

2021/0028843 A1     1/2021  Zhou
2022/0078638 A1     3/2022  Zhou
2022/0174686 A1     6/2022  Xiao et al.
2023/0361837 A1    11/2023  Wang

FOREIGN PATENT DOCUMENTS

WO          2021163162 A1      8/2021
WO          2022152118 A1      7/2022
WO      WO-2024154076 A1 *     7/2024   ............. H04B 7/066
WO      WO-2024170645 A1 *     8/2024   ........... H04L 5/0048

OTHER PUBLICATIONS

"5G; NR; Physical channels and modulation (3GPP TS 38.211 version 17.4.0 Release 17)", ETSI TS 138 211 V17.4.0, Jan. 2023, 141 pages.

"5G; NR; Multiplexing and channel coding (3GPP TS 38.212 version 17.4.0 Release 17)", ETSI TS 138 212 V17.4.0, Jan. 2023, 206 pages.
"5G; NR; Physical layer procedures for control (3GPP TS 38.213 version 17.4.0 Release 17)", ETSI TS 138 213 V17.4.0, Jan. 2023, 263 pages.
"5G; NR; Physical layer procedures for data (3GPP TS 38.214 version 17.4.0 Release 17)", ETSI TS 138 214 V17.4.0, Jan. 2023, 236 pages.
"5G; NR; Medium Access Control (MAC) protocol specification (3GPP TS 38.321 version 17.3.0 Release 17)", ETSI TS 138 321 V17.3.0, Jan. 2023, 254 pages.
"5G; NR; Radio Resource Control (RRC); Protocol specification (3GPP TS 38.331 version 17.3.0 Release 17)", ETSI TS 138 331 V17.3.0, Jan. 2023, 1295 pages.
Supplementary European Search Report dated Apr. 29, 2026, in connection with European Patent Application No. 24757222.5, 8 pages.

* cited by examiner

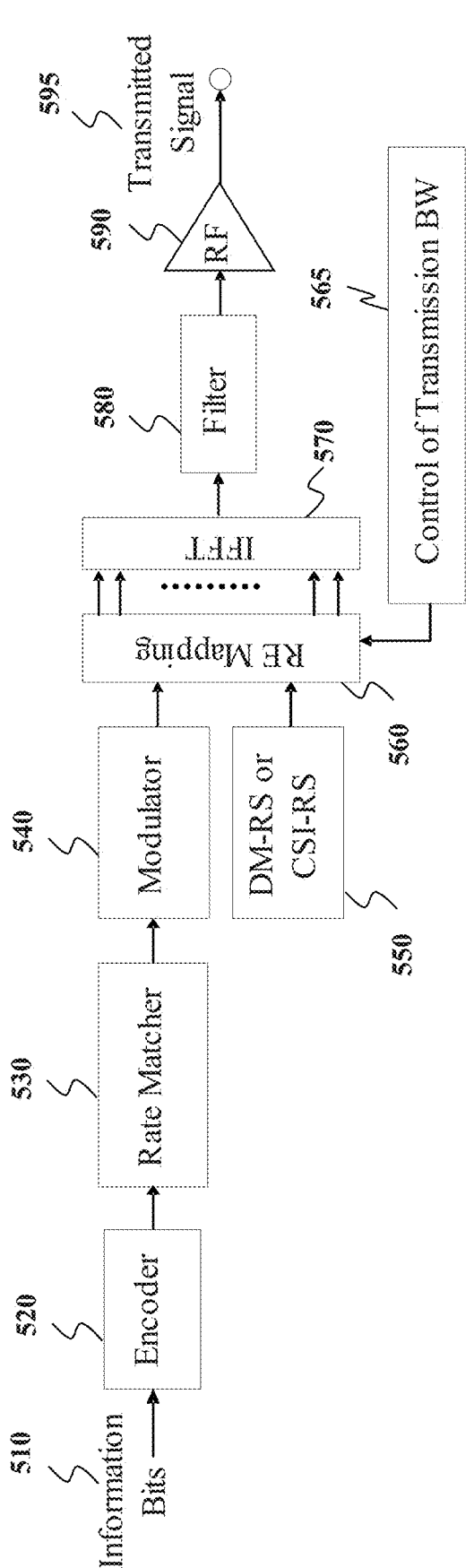
FIG. 5

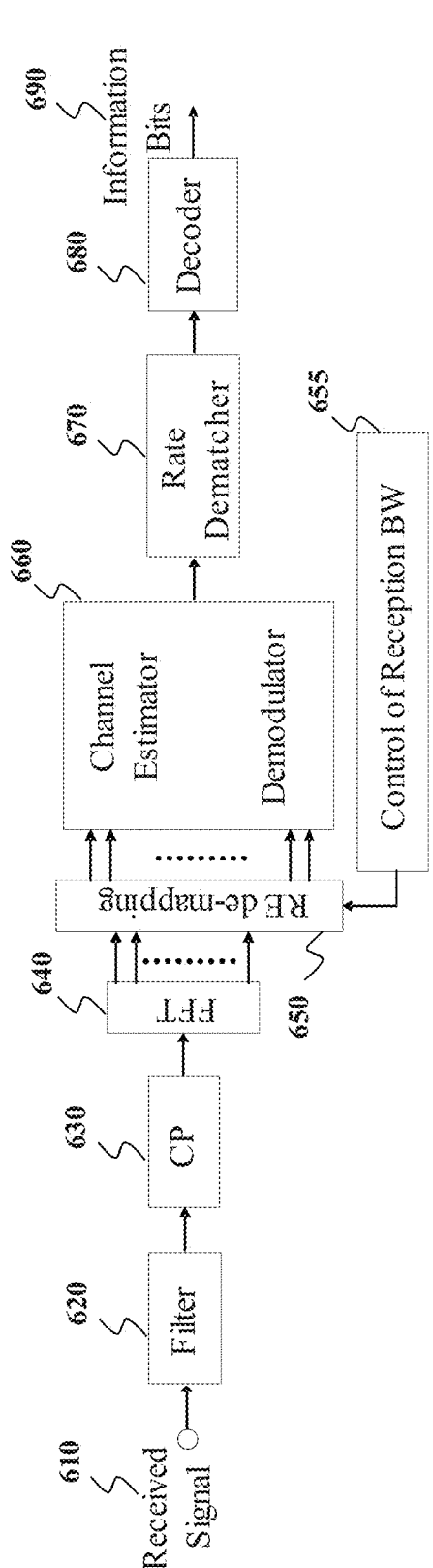
FIG. 6

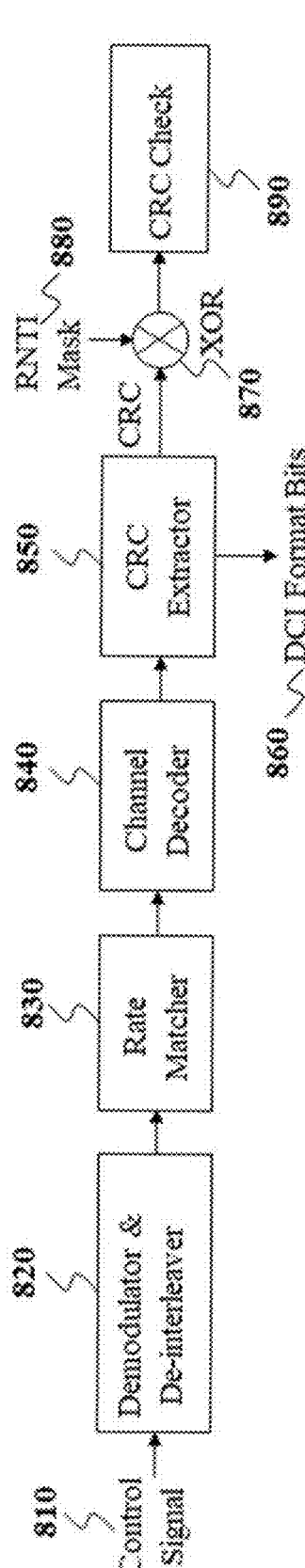
FIG. 8

1200

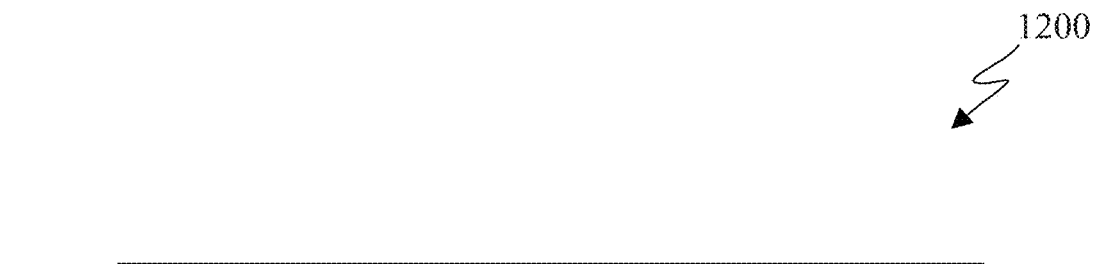

1210 — A UE is provided from a serving gNB by a higher layer signaling one or multiple CSI report configurations, where each configuration includes one or multiple CSI-RS resource configurations, codebook configurations, and/or CSI-RS to PDSCH power offsets.

1220 — The UE receives an indication from the serving gNB for one or more indexes of CSI-RS resource configurations, and/or CSI-RS to PDSCH power offsets from the set of configurations via L1, L2, or higher layer signaling for a given CSI report configuration.

1230 — The UE sends CSI report including one or more multiple report quantities according to the indication to the serving gNB

FIG. 12

[1ˢᵗ configuration]
[2ⁿᵈ configuration]
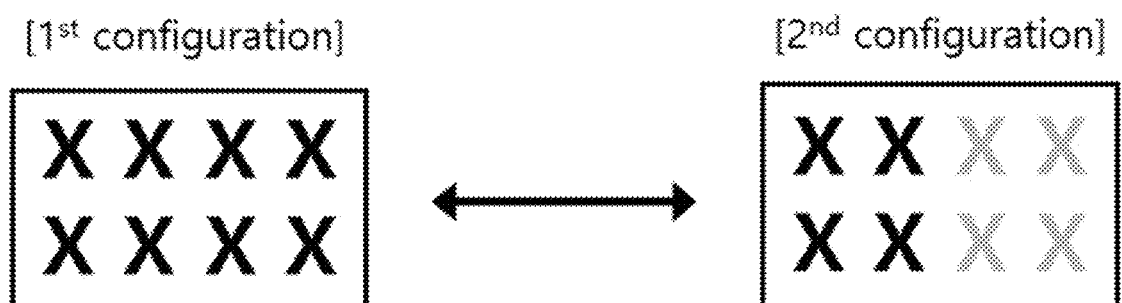
FIG. 13

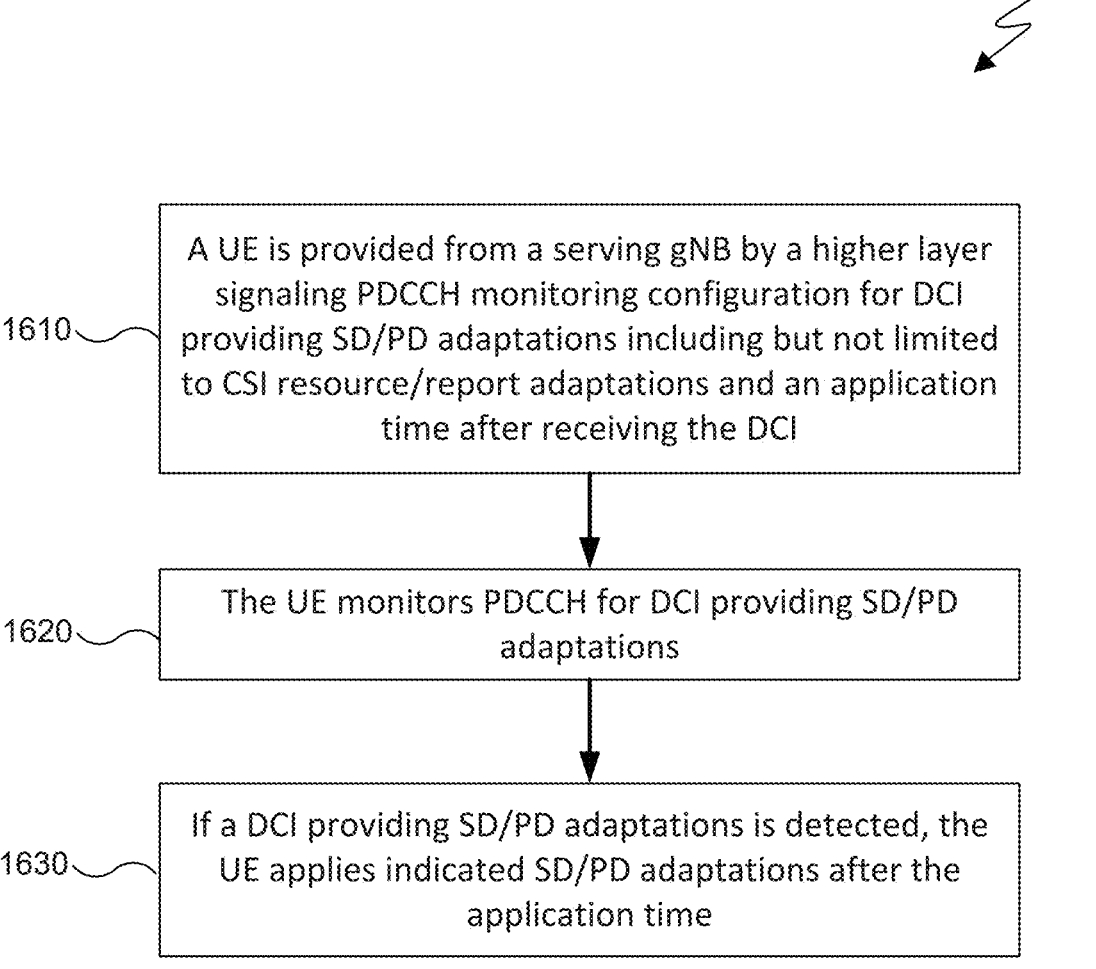

1600

1610 — A UE is provided from a serving gNB by a higher layer signaling PDCCH monitoring configuration for DCI providing SD/PD adaptations including but not limited to CSI resource/report adaptations and an application time after receiving the DCI 1620 — The UE monitors PDCCH for DCI providing SD/PD adaptations 1630 — If a DCI providing SD/PD adaptations is detected, the UE applies indicated SD/PD adaptations after the application time

FIG. 16

CHANNEL STATE INFORMATION MEASUREMENT AND REPORTING WITH NETWORK ADAPTATION

CROSS-REFERENCE TO RELATED APPLICATION AND CLAIM OF PRIORITY

This application claims priority under 35 U.S.C. § 119(e) to U.S. Provisional Patent Application No. 63/446,232 filed on Feb. 16, 2023, and to U.S. Provisional Patent Application No. 63/456,905 filed on Apr. 4, 2023. The above-identified provisional patent applications are hereby incorporated by reference in its entirety.

TECHNICAL FIELD

The present disclosure relates generally to wireless communication systems and, more specifically, relates to enhancements for channel state information (CSI) measurement and reporting with network adaptation.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to CSI measurement and reporting with network adaptation.

In an embodiment, a method for a user equipment (UE) to report CSI is provided. The method includes receiving: first information related to reception of one or more non-zero power CSI reference signals (NZP CSI-RSs) on a cell, second information related to determining a CSI report, third information related to indicating a second number CSI sub-reports from the first number of CSI sub-reports, fourth information related to an uplink (UL) channel for transmitting the CSI report, and the one or more NZP CSI-RSs based on the first information. The second information includes a set of parameters that commonly apply to a first number of CSI sub-reports and a first number of sets of parameters to apply to the first number of CSI sub-reports, respectively. The first number of sets of parameters are related to adaptations of the NZP CSI-RSs in one or more of power or spatial domains. The method further includes determining the second number of CSI sub-reports based on the second information, the third information, and the reception of the one or more NZP CSI-RSs, and a third number of CSI sub-reports from the second number of CSI sub-reports based on the fourth information. The method further includes transmitting the UL channel with the CSI report including the third number of CSI sub-reports.

In another embodiment, a UE is provided. The UE includes a transceiver configured to receive: first information related to reception of one or more NZP CSI-RSs on a cell, second information related to determining a CSI report, third information related to indicating a second number CSI sub-reports from the first number of CSI sub-reports, fourth information related to an UL channel for transmitting the CSI report, and the one or more NZP CSI-RSs based on the first information. The second information includes a set of parameters that commonly apply to a first number of CSI sub-reports and a first number of sets of parameters to apply to the first number of CSI sub-reports, respectively. The first number of sets of parameters are related to adaptations of the NZP CSI-RSs in one or more of power or spatial domains. The UE further includes a processor operably coupled to the transceiver. The processor configured to determine the second number of CSI sub-reports based on the second information, the third information, and the reception of the one or more NZP CSI-RSs and a third number of CSI sub-reports from the second number of CSI sub-reports based on the fourth information. The transceiver is further configured to transmit the UL channel with the CSI report including the third number of CSI sub-reports.

In yet another embodiment, a base station (BS) is provided. The BS includes a processor and a transceiver operably coupled to the processor. The transceiver is configured to transmit first information related to transmission of one or more NZP CSI-RSs on a cell, second information related to determining a CSI report, third information related to indicating a second number CSI sub-reports from the first number of CSI sub-reports, fourth information related to an UL channel for the CSI report, and the one or more NZP CSI-RSs based on the first information. The second information includes a set of parameters that commonly apply to a first number of CSI sub-reports and a first number of sets of parameters to apply to the first number of CSI sub-reports, respectively. The first number of sets of parameters are related to adaptations of the NZP CSI-RSs in one or more of power or spatial domains. The transceiver is configured to receive the UL channel with the CSI report including a third number of CSI sub-reports. The third number of CSI sub-reports are from the second number of CSI sub-reports based on the fourth information. The second number of CSI sub-reports are based on the second information, the third information, and the one or more NZP CSI-RSs.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 5 illustrates a block diagram of an example transmitter structure using orthogonal frequency division multiplexing (OFDM) according to embodiments of the present disclosure;

FIG. 6 illustrates a block diagram of an example receiver structure using OFDM according to embodiments of the present disclosure;

FIG. 8 illustrates a block diagram of an example decoding process for a DCI format for use with a UE according to embodiments of the present disclosure;

FIG. 12 illustrates a flowchart for a UE to receive CSI report configurations and provide respective CSI reports according to embodiments of the present disclosure;

FIG. 13 illustrates an example diagram of CSI-RS resource adaptation hypotheses for CSI report according to embodiments of the present disclosure;

FIG. 16 illustrates an example flowchart for a UE to apply spatial domain (SD)/power domain (PD) adaptation indicated by DCI according to embodiments of the present disclosure.

DETAILED DESCRIPTION

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents and standards descriptions are hereby incorporated by reference into the present disclosure as if fully set forth herein: 3GPP TS 38.211 v17.4.0, "NR; Physical channels and modulation" (REF1); 3GPP TS 38.212 v17.4.0, "NR; Multiplexing and Channel coding" (REF2); 3GPP TS 38.213 v17.4.0, "NR; Physical Layer Procedures for Control" (REF3); 3GPP TS 38.214 v17.4.0, "NR; Physical Layer Procedures for Data" (REF4); 3GPP TS 38.331 v17.3.0, "NR; Radio Resource Control (RRC) Protocol Specification" (REF5); and 3GPP TS 38.321 v17.3.0, "NR; Medium Access Control (MAC) protocol specification" (REF6).

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 1:
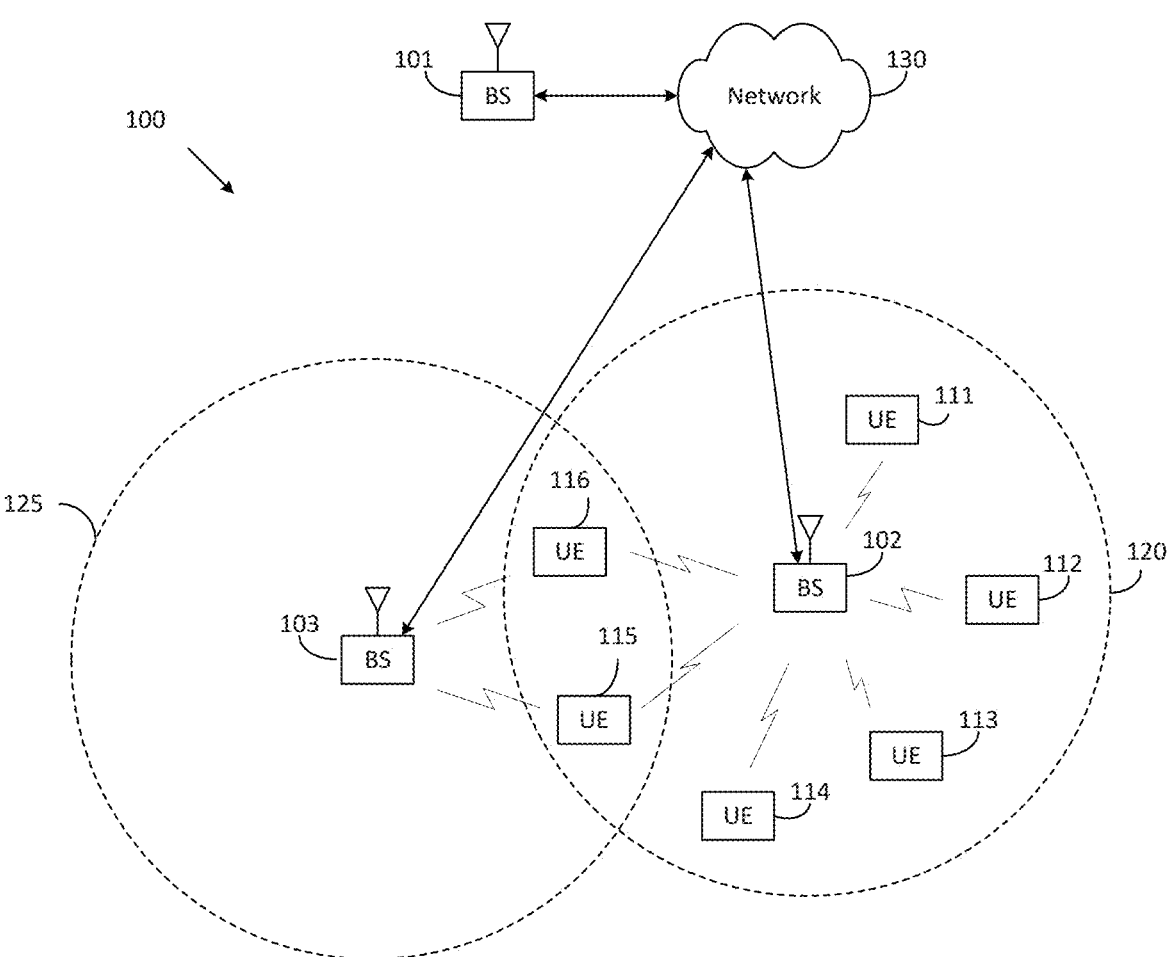
FIG. 1 illustrates an example wireless network according to embodiments of the present disclosure.
Figure 2:
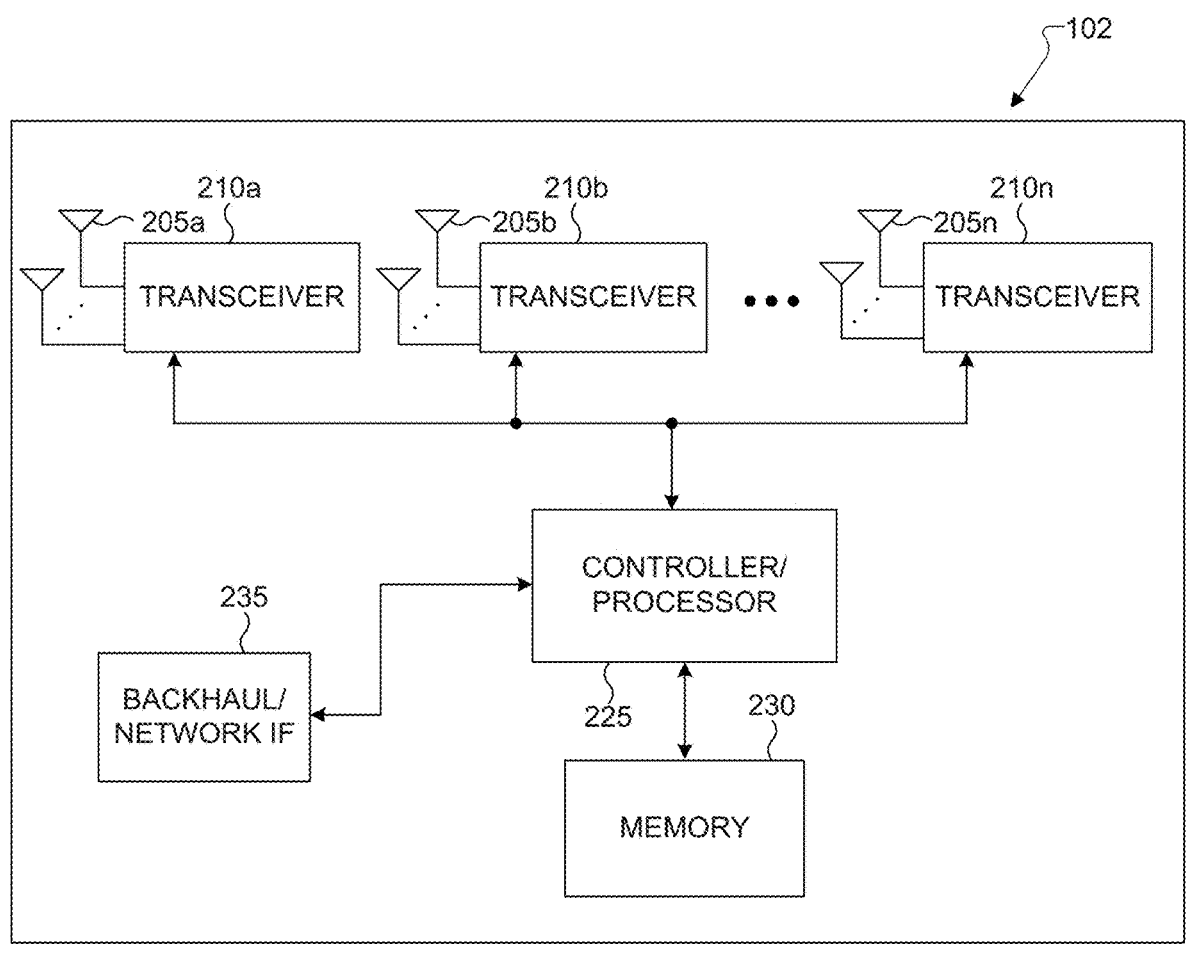
FIG. 2 illustrates an example base station according to embodiments of the present disclosure.
Figure 3:
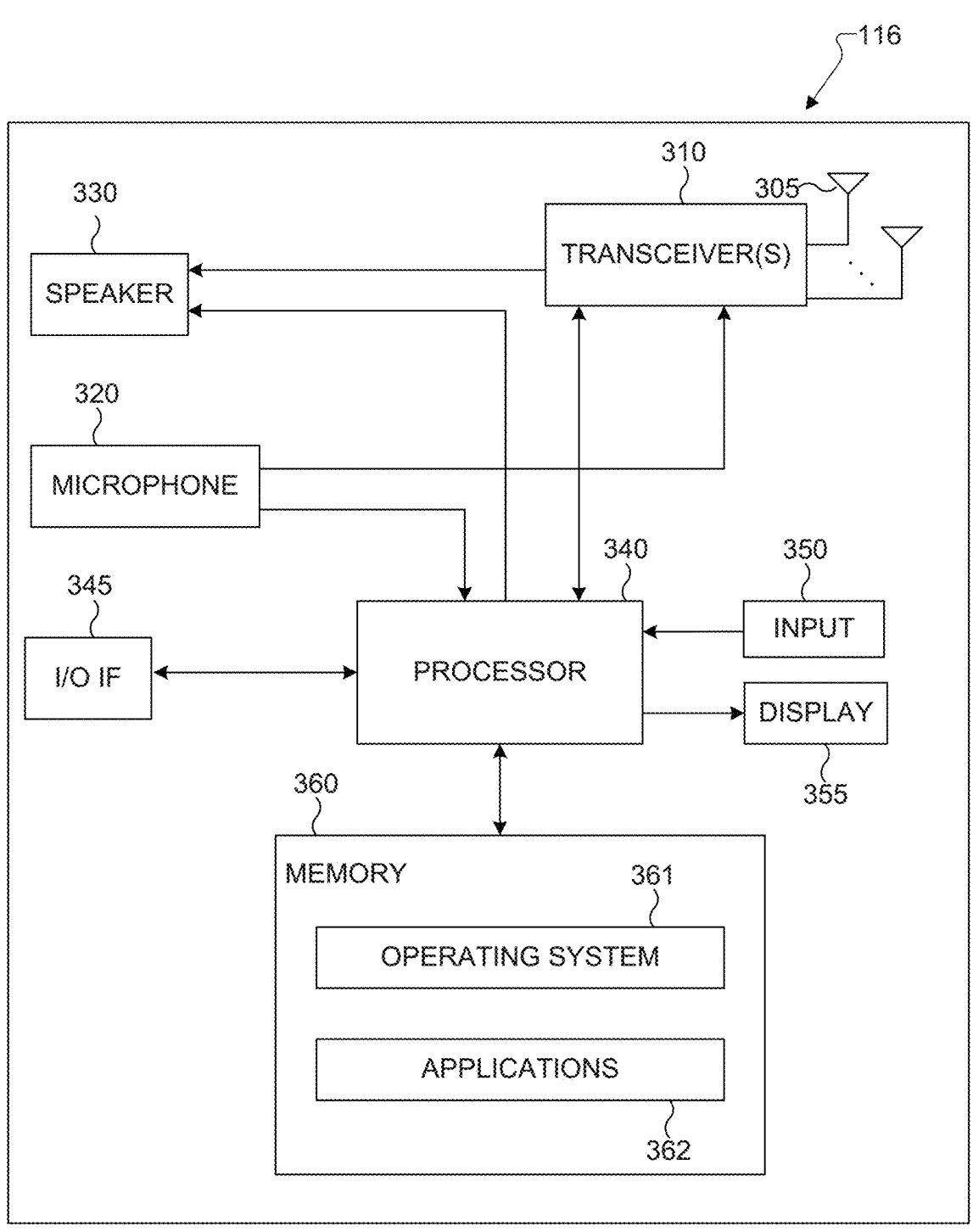
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal,"

"wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for CSI measurement and reporting with network adaptation. In certain embodiments, one or more of the BSs 101-103 include circuitry, programing, or a combination thereof to support enhancements for CSI measurement and reporting with network adaptation.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235. The gNB 102, via the controller or processor 225, may support enhancements for CSI measurement and reporting with network adaptation in accordance with various embodiments of this disclosure.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-

210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as processes to support radio link monitoring in FD systems as discussed in greater detail below. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE. In embodiments of this disclosure, the UE 116 may use enhancements for CSI measurement and reporting with network adaptation, via at least the antenna(s) 305, transceiver(s) 310 and the processor 340.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. For example, as discussed in greater detail below, the processor 340 may execute processes to perform CSI measurement and reporting with network adaptation. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4A:
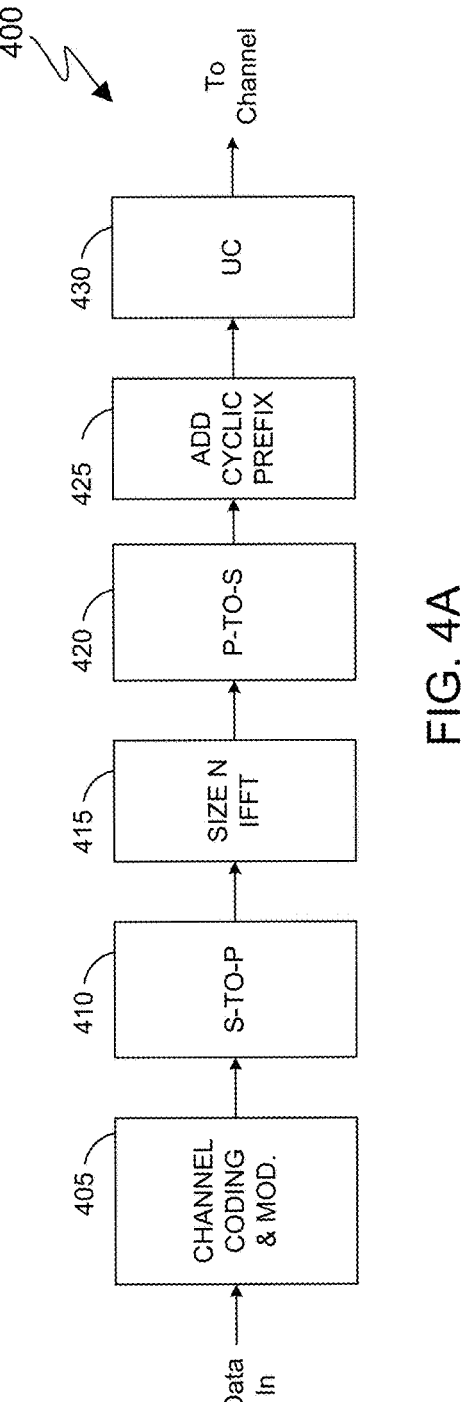
FIGS. 4A-B illustrate example wireless transmit and receive paths according to embodiments of the present disclosure.
Figure 4B:
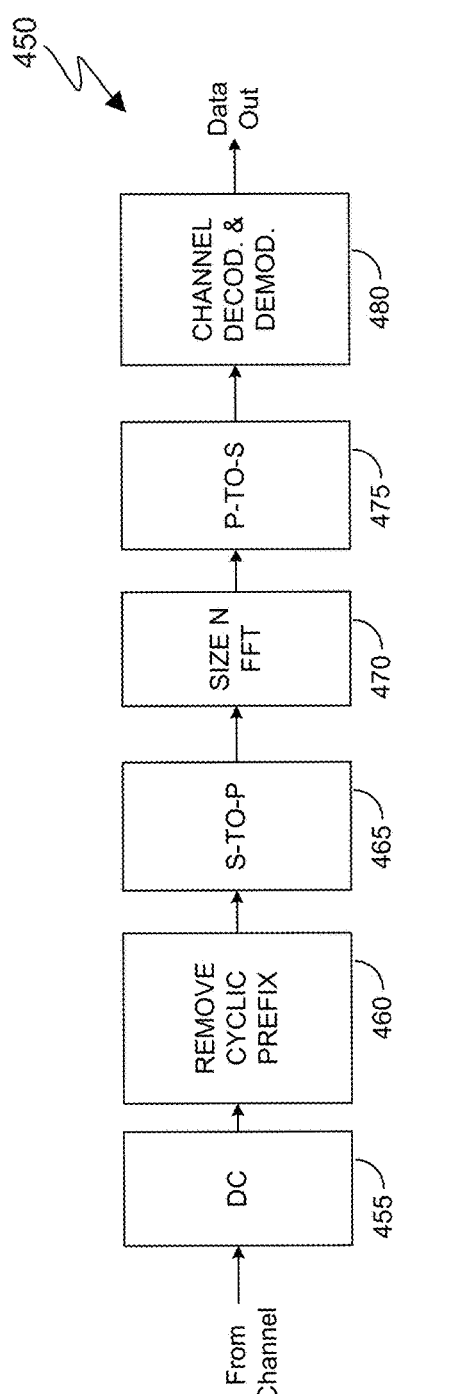

FIGS. 4A and 4B illustrate example wireless transmit and receive paths according to this disclosure. In the following description, a transmit path 400 may be described as being implemented in an gNB (such as gNB 104), while a receive path 450 may be described as being implemented in a UE (such as UE 116). However, it will be understood that the receive path 450 can be implemented in an gNB and that the transmit path 400 can be implemented in a UE. The transmit path 400 and the receive path 450 may each support enhancements for CSI measurement and reporting with network adaptation in accordance with embodiments of this disclosure.

The transmit path 400 includes a channel coding and modulation block 405, a serial-to-parallel (S-to-P) block 410, a size N Inverse Fast Fourier Transform (IFFT) block 415, a parallel-to-serial (P-to-S) block 440, an add cyclic prefix block 445, and an up-converter (UC) 430. The receive path 450 includes a down-converter (DC) 455, a remove cyclic prefix block 460, a serial-to-parallel (S-to-P) block 465, a size N Fast Fourier Transform (FFT) block 470, a parallel-to-serial (P-to-S) block 475, and a channel decoding and demodulation block 480.

In the transmit path 400, the channel coding and modulation block 405 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the gNB 104 and the UE 116. The size N IFFT block 415 performs an IFFT operation on the N parallel symbol streams to generate time-domain output signals. The parallel-to-serial block 440 converts (such as multiplexes) the parallel time-domain output symbols from the size N IFFT block 415 in order to generate a serial time-domain signal. The add cyclic prefix block 445 inserts a cyclic prefix to the time-domain signal. The up-converter 430 modulates (such as up-converts) the output of the add cyclic prefix block 445 to an RF frequency for transmission via a wireless channel. The signal may also be filtered at baseband before conversion to the RF frequency.

A transmitted RF signal from the gNB 104 arrives at the UE 116 after passing through the wireless channel, and reverse operations to those at the gNB 104 are performed at the UE 116. The down-converter 455 down-converts the received signal to a baseband frequency, and the remove cyclic prefix block 460 removes the cyclic prefix to generate a serial time-domain baseband signal. The serial-to-parallel block 465 converts the time-domain baseband signal to parallel time domain signals. The size N FFT block 470 performs an FFT algorithm to generate N parallel frequency-domain signals. The parallel-to-serial block 475 converts the parallel frequency-domain signals to a sequence of modulated data symbols. The channel decoding and demodulation block 480 demodulates and decodes the modulated symbols to recover the original input data stream.

Each of the gNBs 101-103 may implement a transmit path 400 that is analogous to transmitting in the downlink to UEs 111-116 and may implement a receive path 450 that is analogous to receiving in the uplink from UEs 111-116. Similarly, each of UEs 111-116 may implement a transmit path 400 for transmitting in the uplink to gNBs 101-103 and may implement a receive path 450 for receiving in the downlink from gNBs 101-103. In embodiments, the transmit path 400 and the receive path 450 are each configured to support CSI and radio link monitoring with reference signal adaptation.

Each of the components in FIGS. 4A and 4B can be implemented using only hardware or using a combination of hardware and software/firmware. As a particular example, at least some of the components in FIGS. 4A and 4B may be implemented in software, while other components may be implemented by configurable hardware or a mixture of software and configurable hardware. For instance, the FFT block 470 and the IFFT block 415 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, can be used. It will be appreciated that the value of the variable N may be any integer number (such as 1, 4, 3, 4, or the like) for DFT and IDFT functions, while the value of the variable N may be any integer number that is a power of two (such as 1, 4, 4, 8, 16, or the like) for FFT and IFFT functions.

Although FIGS. 4A and 4B illustrate examples of wireless transmit and receive paths, various changes may be made to FIGS. 4A and 4B. For example, various components in FIGS. 4A and 4B can be combined, further subdivided, or omitted and additional components can be added according to particular needs. Also, FIGS. 4A and 4B are meant to illustrate examples of the types of transmit and receive paths that can be used in a wireless network. Any other suitable architectures can be used to support wireless communications in a wireless network.

In the following, an italicized name for a parameter implies that the parameter is provided by higher layers.

DL transmissions or UL transmissions can be based on an OFDM waveform including a variant using DFT precoding that is known as DFT-spread-OFDM that is typically applicable to UL transmissions.

In the following, subframe (SF) refers to a transmission time unit for the LTE RAT and slot refers to a transmission time unit for an NR RAT. For example, the slot duration can be a sub-multiple of the SF duration. NR can use a different DL or UL slot structure than an LTE SF structure. Differences can include a structure for transmitting physical downlink control channels (PDCCHs), locations and structure of demodulation reference signals (DM-RS), transmission duration, and so on. Further, eNB refers to a base station serving UEs operating with LTE RAT and gNB refers to a base station serving UEs operating with NR RAT. Exemplary embodiments consider a same numerology, that includes a sub-carrier spacing (SCS) configuration and a cyclic prefix (CP) length for an OFDM symbol, for transmission with LTE RAT and with NR RAT. In such case, OFDM symbols for the LTE RAT as same as for the NR RAT, a subframe is same as a slot and, for brevity, the term slot is subsequently used in the remaining of the disclosure.

A unit for DL signaling or for UL signaling on a cell is referred to as a slot and can include one or more symbols. A bandwidth (BW) unit is referred to as a resource block (RB). One RB includes a number of sub-carriers (SCs). For example, a slot can have duration of one millisecond and an RB can have a bandwidth of 180 kHz and include 12 SCs with inter-SC spacing of 15 kHz. A sub-carrier spacing (SCS) can be determined by a SCS configuration y as 2-15 kHz. A unit of one sub-carrier over one symbol is referred to as resource element (RE). A unit of one RB over one symbol is referred to as physical RB (PRB).

DL signaling include physical downlink shared channels (PDSCHs) conveying information content, PDCCHs conveying DL control information (DCI), and reference signals (RS). A PDCCH can be transmitted over a variable number of slot symbols including one slot symbol and over a number of control channel elements (CCEs) from a predetermined set of numbers of CCEs referred to as CCE aggregation level within a control resource set (CORESET) as described in REF1 and REF3.

FIG. 5 illustrates a block diagram of an example transmitter structure 500 using OFDM according to this disclosure. The embodiment of the example transmitter structure 500 illustrated in FIG. 5 is for illustration only. One or more of the components illustrated in FIG. 5 can be implemented in specialized circuitry configured to perform the noted functions or one or more of the components can be implemented by one or more processors executing instructions to perform the noted functions. FIG. 5 does not limit the scope of this disclosure to any particular implementation of the example transmitter structure 500.

Information bits, such as DCI bits or data bits 510, are encoded by encoder 520, rate matched to assigned time/frequency resources by rate matcher 530, and modulated by modulator 540. Subsequently, modulated encoded symbols and DM-RS or CSI-RS 550 are mapped to REs 560 by RE mapping unit 565, an inverse fast Fourier transform (IFFT) is performed by filter 570, a cyclic prefix (CP) is added by CP insertion unit 580, and a resulting signal is filtered by filter 590 and transmitted by a radio frequency (RF) unit 595. In embodiments, the transmitter structure 500 may be used to support enhancements for CSI measurement and reporting with network adaptation.

FIG. 6 illustrates a block diagram of an example receiver structure 600 using OFDM according to this disclosure. The embodiment of the example receiver structure 600 illustrated in FIG. 6 is for illustration only. FIG. 6 does not limit the scope of this disclosure to any particular implementation of the example receiver structure 600.

A received signal 610 is filtered by filter 620, a CP removal unit removes a CP 630, a filter 640 applies a fast Fourier transform (FFT), RE de-mapping unit 650 de-maps REs selected by BW selector unit 655, received symbols are demodulated by a channel estimator and a demodulator unit 660, a rate de-matcher 670 restores a rate matching, and a decoder 680 decodes the resulting bits to provide information bits 690. In embodiments, the receiver structure 600 may be used to support enhancements for CSI measurement and reporting with network adaptation.

DCI can serve several purposes. A DCI format includes information elements (IEs) and is typically used for scheduling a PDSCH (DL DCI format) or a PUSCH (UL DCI format) transmission. A DCI format includes cyclic redundancy check (CRC) bits in order for a UE to confirm a correct detection. A DCI format type is identified by a radio network temporary identifier (RNTI) that scrambles the CRC bits. For a DCI format scheduling a PDSCH or a PUSCH for a single UE with radio resource control (RRC) connection to a gNB, the RNTI is a cell RNTI (C-RNTI) or another RNTI type such as a MCS-C-RNTI. For a DCI format scheduling a PDSCH conveying system information (SI) to a group of UEs, the RNTI is a SI-RNTI. For a DCI format scheduling a PDSCH providing a response to a random access (RA) from a group of UEs, the RNTI is a RA-RNTI. For a DCI format scheduling a PDSCH providing contention resolution in Msg4 of a RA process, the RNTI is a temporary C-RNTI (TC-RNTI). For a DCI format scheduling a PDSCH paging a group of UEs, the RNTI is a P-RNTI. For a DCI format providing transmission power control (TPC) commands to a group of UEs, the RNTI is a TPC-RNTI, and so on. Each RNTI type is configured to a UE through higher layer signaling. A UE typically decodes at multiple candidate locations for potential PDCCH transmissions.

Figure 7:
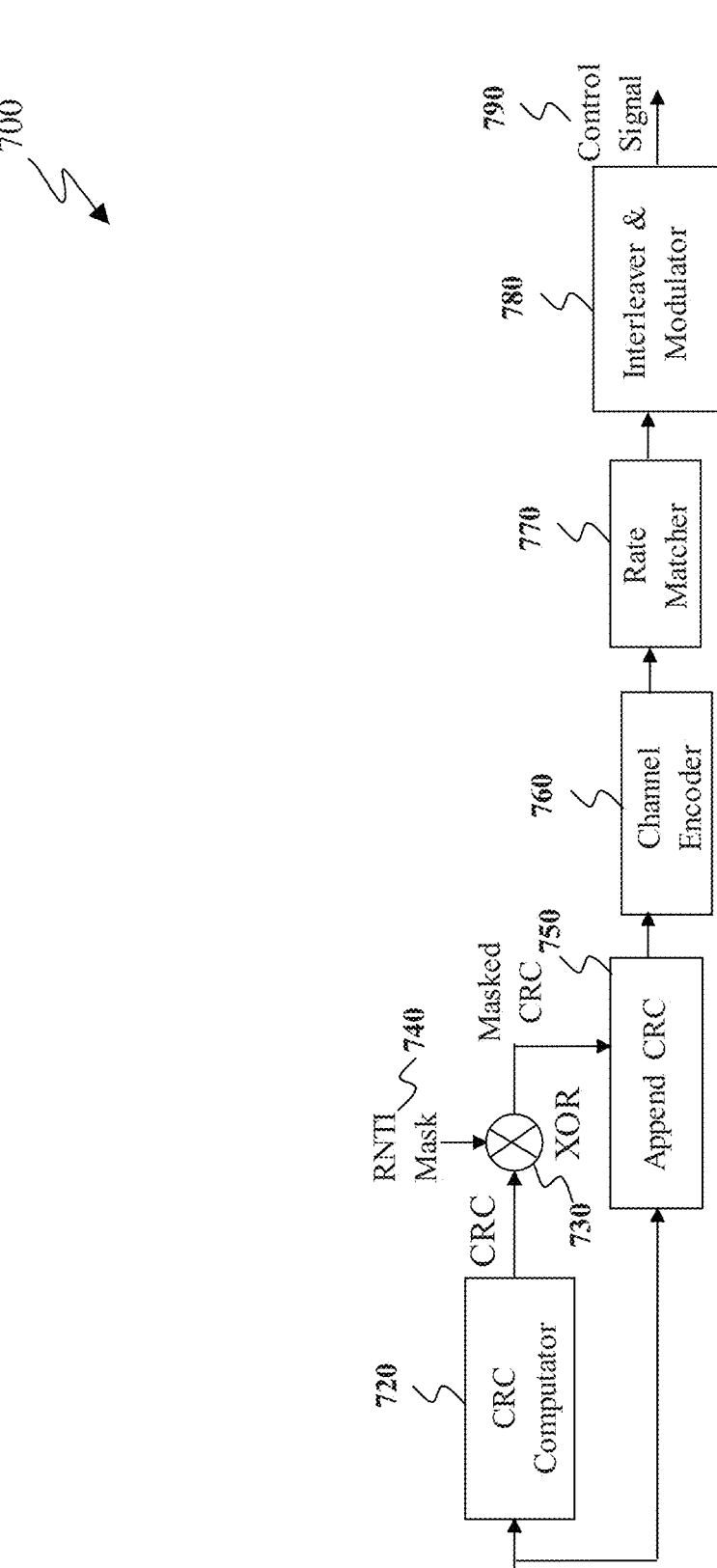
FIG. 7 illustrates a block diagram of an example encoding process for a downlink control information (DCI) format according to embodiments of the present disclosure.

FIG. 7 illustrates a block diagram of an example encoding process 700 for a DCI format according to this disclosure. The embodiment of the example encoding process 700 illustrated in FIG. 7 is for illustration only. One or more of the components illustrated in FIG. 7 can be implemented in specialized circuitry configured to perform the noted functions or one or more of the components can be implemented by one or more processors executing instructions to perform the noted functions. FIG. 7 does not limit the scope of this disclosure to any particular implementation of the example encoding process 700.

A gNB separately encodes and transmits each DCI format in a respective PDCCH. When applicable, a RNTI for a UE that a DCI format is intended for masks a cyclic redundancy check (CRC) of the DCI format codeword in order to enable the UE to identify the DCI format. For example, the CRC can include 24 bits and the RNTI can include 16 bits or 24 bits. The CRC of (non-coded) DCI format bits 710 is determined using a CRC computation unit 720, and the CRC is masked using an exclusive OR (XOR) operation unit 730 between CRC bits and RNTI bits 740. The XOR operation is defined as XOR(0,0)=0, XOR(0,1)=1, XOR(1,0)=1, XOR(1,1)=0. The masked CRC bits are appended to DCI format information bits using a CRC append unit 750. An encoder 760 performs channel coding, such as polar coding, followed by rate matching to allocated resources by rate matcher 770. Interleaving and modulation units 780 apply interleaving and modulation, such as QPSK, and the output control signal 790 is transmitted. In embodiments, the encoding process 700 may be used to support enhancements for CSI measurement and reporting with network adaptation.

FIG. 8 illustrates a block diagram of an example decoding process 800 for a DCI format for use with a UE according to this disclosure. The embodiment of the example decoding process 800 illustrated in FIG. 8 is for illustration only. FIG. 8 does not limit the scope of this disclosure to any particular implementation of the example decoding process 800.

A received control signal 810 is demodulated and de-interleaved by a demodulator and a de-interleaver 820. A rate matching applied at a gNB transmitter is restored by rate matcher 830, and resulting bits are decoded by decoder 840. After decoding, a CRC extractor 850 extracts CRC bits and provides DCI format information bits 860. The DCI format information bits are de-masked 870 by an XOR operation with a RNTI 880 (when applicable) and a CRC check is performed by unit 890. When the CRC check succeeds (check-sum is zero), the DCI format information bits are considered to be valid. When the CRC check does not succeed, the DCI format information bits are considered to be invalid. In embodiments, the decoding process 800 may be used to support enhancements for CSI measurement and reporting with network adaptation.

For each DL bandwidth part (BWP) indicated to a UE in a serving cell, the UE can be provided by higher layer signaling with P≤3 control resource sets (CORESETs). For each CORESET, the UE is provided a CORESET index p, 0≤p<12, a DM-RS scrambling sequence initialization value, a precoder granularity for a number of resource element groups (REGs) in the frequency domain where the UE can assume use of a same DM-RS precoder, a number of consecutive symbols for the CORESET, a set of resource blocks (RBs) for the CORESET, CCE-to-REG mapping parameters, an antenna port quasi co-location, from a set of antenna port quasi co-locations, indicating quasi co-location information of the DM-RS antenna port for PDCCH reception in a respective CORESET, and an indication for a presence or absence of a transmission configuration indication (TCI) field for DCI format 1_1 transmitted by a PDCCH in CORESET p.

For each DL BWP configured to a UE in a serving cell, the UE is provided by higher layers with S≤10 search space sets. For each search space set from the S search space sets, the UE is provided a search space set index s, 0≤s<40, an association between the search space set s and a CORESET p, a PDCCH monitoring periodicity of $k_s$ slots and a PDCCH monitoring offset of $o_s$ slots, a PDCCH monitoring pattern within a slot, indicating first symbol(s) of the CORESET within a slot for PDCCH monitoring, a duration of $T_s<k_s$ slots indicating a number of slots that the search space set s exists, a number of PDCCH candidates $M_s^{(L)}$ per CCE aggregation level L, and an indication that search space set s is either a Common Search Space (CSS) set or a UE-specific search space (USS) set. When search space set s is a CSS set, the UE monitors PDCCH for detection of DCI format 2_x, where x ranges from 0 to 7 as described in REF2, or for DCI formats associated with scheduling broadcast/multicast PDSCH receptions, and possibly for DCI format 0_0 and DCI format 1_0.

A UE determines a PDCCH monitoring occasion on an active DL BWP from the PDCCH monitoring periodicity, the PDCCH monitoring offset, and the PDCCH monitoring pattern within a slot. For search space set s, the UE determines that a PDCCH monitoring occasion(s) exists in a slot with number $$n_{s,f}^{\mu}$$

in a frame with number $n_f$ if $$\left(n_f \cdot N_{slot}^{frame,\mu} + n_{s,f}^{\mu} - o_s\right) \bmod k_s = 0.$$

The UE monitors PDCCH candidates for search space set s for $T_s$ consecutive slots, starting from slot $$n_{s,f}^{\mu},$$

and does not monitor PDCCH candidates for search space set s for the next $k_s - T_s$ consecutive slots. The UE determines CCEs for monitoring PDCCH according to a search space set based on a search space equation as described in REF3.

A UE expects to monitor PDCCH candidates for up to 4 sizes of DCI formats that include up to 3 sizes of DCI formats with CRC scrambled by C-RNTI per serving cell.

The UE counts a number of sizes for DCI formats per serving/scheduled cell based on a number of PDCCH candidates in respective search space sets for the corresponding active DL BWP. In the following, for brevity, that constraint for the number of DCI format sizes will be referred to as DCI size limit. When the DCI size limit would be exceeded for a UE based on a configuration of DCI formats that the UE monitors PDCCH, the UE aligns the size of some DCI formats, as described in REF2, so that the DCI size limit would not be exceeded.

For each scheduled cell, the UE is not required to monitor on the active DL BWP with SCS configuration μ of the scheduling cell more than $$\min\left(M_{PDCCH}^{max,slot,\mu}, M_{PDCCH}^{total,slot,\mu}\right) PDCCH$$

candidates or more than $$\min\left(C_{PDCCH}^{max,slot,\mu}, C_{PDCCH}^{total,slot,\mu}\right)$$

non-overlapped CCEs per slot, wherein $$M_{PDCCH}^{max,slot,\mu}$$

and $$C_{PDCCH}^{max,slot,\mu}$$

are respectively a maximum number of PDCCH candidates and non-overlapping CCEs for a scheduled cell and $$M_{PDCCH}^{total,slot,\mu}$$

and $$C_{PDCCH}^{total,slot,\mu}$$

are respectively a total number of PDCCH candidates and non-overlapping CCEs for a scheduling cell, as described in REF3.

A UE does not expect to be configured CSS sets, other than CSS sets for multicast PDSCH scheduling, that result to corresponding total, or per scheduled cell, numbers of monitored PDCCH candidates and non-overlapped CCEs per slot on the primary cell that exceed the corresponding maximum numbers per slot. For USS sets or for CSS sets associated with multicast PDSCH scheduling, when a number of PDCCH candidates or non-overlapping CCEs in a slot would exceed the aforementioned limits/maximum per slot for scheduling on the primary cell, the UE selects the USS sets or the CSS sets to monitor corresponding PDCCH in an ascending order of a corresponding search space set index until and an index of a search space set for which PDCCH monitoring would result to exceeding the maximum number of PDCCH candidates or non-overlapping CCEs per slot for scheduling on the PCell as described in REF3.

For same cell scheduling or for cross-carrier scheduling where a scheduling cell and scheduled cells have DL BWPs with same SCS configuration y, a UE does not expect a number of PDCCH candidates, and a number of corresponding non-overlapped CCEs per slot on a secondary cell to be larger than the corresponding numbers that the UE is capable of monitoring on the secondary cell per slot. For cross-carrier scheduling, the number of PDCCH candidates for monitoring and the number of non-overlapped CCEs per slot are separately counted for each scheduled cell.

A UE can be configured for operation with carrier aggregation (CA) for PDSCH receptions over multiple cells (DL CA) or for PUSCH transmissions over multiple cells (UL CA). The UE can also be configured multiple transmission-reception points (TRPs) per cell via indication (or absence of indication) of a coresetPoolIndex for CORESETs where the UE receives PDCCH/PDSCH from a corresponding TRP as described in REF3 and REF4.

Multiple input multiple output (MIMO) technologies have been playing a key role in boosting system throughput both in NR and LTE and such a role will be continued and further expanded in the future generation wireless technologies.

For MIMO operation, an antenna port is defined such that the channel over which a symbol on the antenna port is conveyed can be inferred from the channel over which another symbol on the same antenna port is conveyed. There is not necessarily one to one correspondence between an antenna port and an antenna element, and a plurality of antenna elements can be mapped onto one antenna port.

Figure 9:
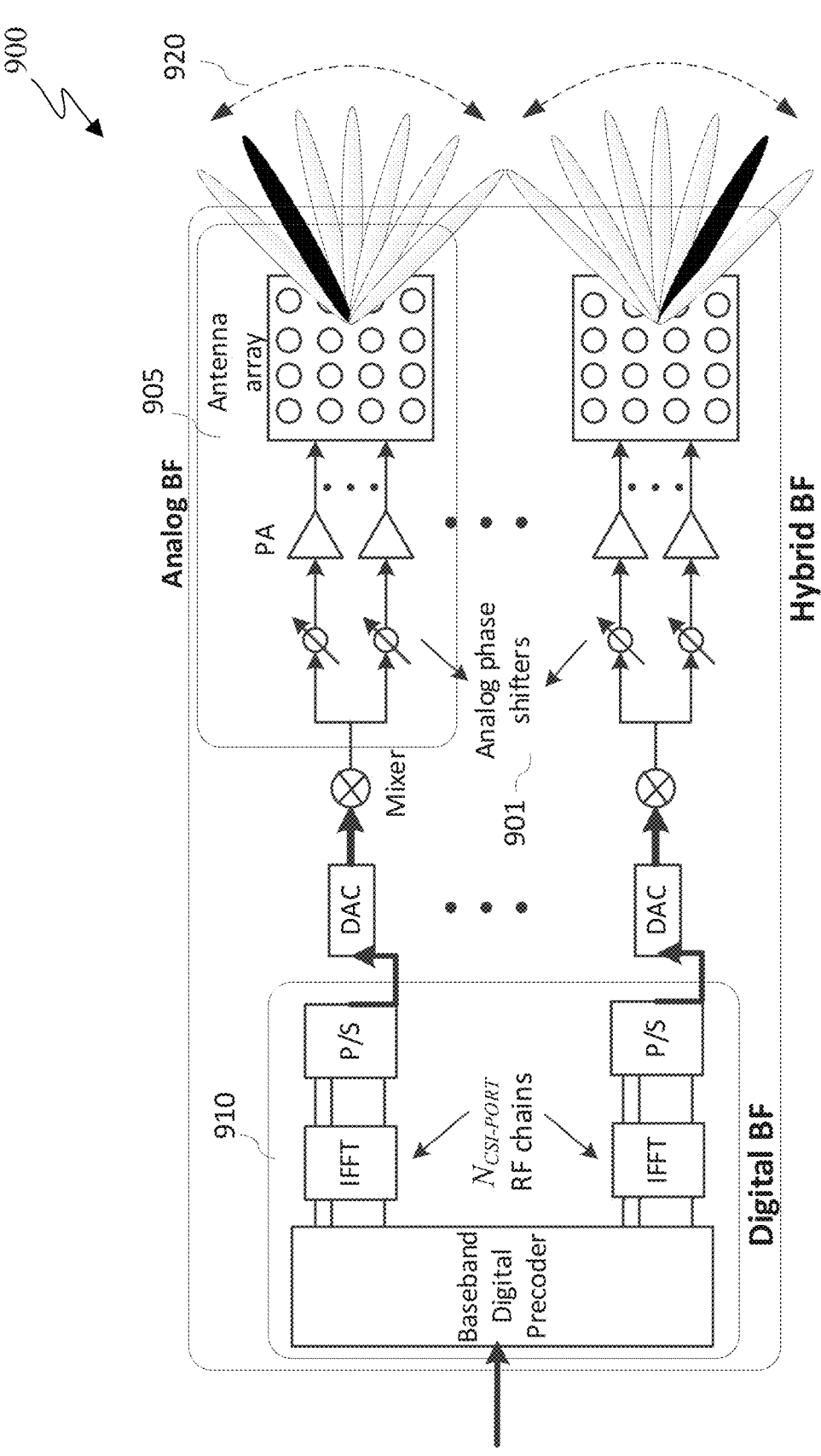
FIG. 9 illustrates an example antenna blocks or arrays forming beams according to embodiments of the present disclosure.

For mmWave bands, although the number of antenna elements can be larger for a given form factor, the number of CSI-RS ports—which can correspond to the number of digitally precoded ports—tends to be limited due to hardware constraints (such as the feasibility to install a large number of analog-to-digital-converters (ADCs)/digital-to-analog converters (DACs) at mmWave frequencies) as illustrated in FIG. 9. In this case, one CSI-RS port is mapped onto a large number of antenna elements which can be controlled by a bank of analog phase shifters. One CSI-RS port can then correspond to one sub-array which produces a narrow analog beam through analog beamforming. This analog beam can be configured to sweep across a wider range of angles by varying the phase shifter bank across symbols, slots or subframes. The number of sub-arrays (equal to the number of RF chains) is the same as the number of CSI-RS ports $N_{CSI\text{-}PORT}$. A digital beamforming unit performs a linear combination across $N_{CSI\text{-}PORT}$ analog beams to further increase precoding gain. While analog beams are wideband (hence not frequency-selective), digital precoding can be varied across frequency sub-bands or resource blocks.

FIG. 9 illustrates an example antenna blocks or arrays 900 forming beams according to embodiments of the present disclosure. The embodiment of the antenna blocks or arrays 900 illustrated in FIG. 9 is for illustration only. FIG. 9 does not limit the scope of this disclosure to any particular implementation of the antenna blocks or arrays 900.

Rel-15 NR specifications support up to 32 CSI-RS antenna ports which enable a gNB to be equipped with a large number of antenna elements (such as 64 or 128). In this case, a plurality of antenna elements is mapped onto one CSI-RS port. For FR2, e.g., mmWave bands, although the number of antenna elements can be larger for a given form factor, the number of CSI-RS ports which can correspond to the number of digitally precoded ports—tends to be limited due to hardware constraints (such as the feasibility to install a large number of ADCs/DACs at mmWave frequencies) as illustrated in FIG. 9. In this case, one CSI-RS port is mapped onto a large number of antenna elements which can be controlled by a bank of analog phase shifters 901. One CSI-RS port can then correspond to one sub-array which produces a narrow analog beam through analog beamforming 905. This analog beam can be configured to sweep across a wider range of angles (920) by varying the phase shifter bank across symbols or subframes. The number of sub-arrays (equal to the number of RF chains) is the same as the number of CSI-RS ports $N_{CSI\text{-}PORT}$. A digital beamforming unit 910 performs a linear combination across $N_{CSI\text{-}PORT}$ analog beams to further increase precoding gain. While analog beams are wideband (hence not frequency-selective), digital precoding can be varied across frequency sub-bands or resource blocks. Receiver operation can be conceived analogously.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

The above system is also applicable to higher frequency bands such as FR2-2, e.g., >52.6 GHz. In this case, the system can employ only analog beams. Due to the O2 absorption loss around 60 GHz frequency (~10 dB additional loss @100 m distance), larger number of and sharper analog beams (hence larger number of radiators in the array) will be needed to compensate for the additional path loss. In embodiments of this disclosure, the example antenna blocks or arrays 900 forming beams may support enhancements for CSI measurement and reporting with network adaptation.

To enable digital precoding, efficient design of CSI-RS is a crucial factor. For this reason, three types of CSI reporting mechanism corresponding to three types of CSI-RS measurement behavior are supported in Rel.13 LTE: 1) 'CLASS A' CSI reporting which corresponds to non-precoded CSI-RS, 2) 'CLASS B' reporting with K=1 CSI-RS resource which corresponds to UE-specific beamformed CSI-RS, 3) 'CLASS B' reporting with K>1 CSI-RS resources which corresponds to cell-specific beamformed CSI-RS. For non-precoded (NP) CSI-RS, a cell-specific one-to-one mapping between CSI-RS port and TXRU is utilized. Here, different CSI-RS ports have the same wide beam width and direction and hence generally cell-wide coverage. For beamformed CSI-RS, beamforming operation, either cell-specific or UE-specific, is applied on a non-zero-power (NZP) CSI-RS resource (including multiple ports). Here, (at least at a given time/frequency) CSI-RS ports have narrow beam widths and hence not cell-wide coverage, and (at least from the eNB perspective) at least some CSI-RS port-resource combinations have different beam directions. The basic principle remains the same in NR.

In scenarios where DL long-term channel statistics can be measured through UL signals at a serving gNB, UE-specific beamformed CSI-RS can be readily used. This is typically feasible when UL-DL duplex distance is sufficiently small.

When this condition does not hold, however, some UE feedback is necessary for the gNB to obtain an estimate of DL long-term channel statistics (or any of its representation thereof). To facilitate such a procedure, a first beamformed CSI-RS transmitted with periodicity T1 (ms) and a second NP CSI-RS transmitted with periodicity T2 (ms), where T1<T2. This approach is termed hybrid CSI-RS. The implementation of hybrid CSI-RS is largely dependent on the definition of CSI process and NZP CSI-RS resource.

One of the key components of a MIMO transmission scheme is the accurate CSI acquisition at the gNB (or TRP). For MU-MIMO, in particular, the availability of accurate CSI is necessary in order to guarantee high MU performance. For TDD systems, the CSI can be acquired using the SRS transmission relying on the channel reciprocity. For FDD systems, on the other hand, it can be acquired using the CSI-RS transmission from gNB, and CSI acquisition and feedback from UE. In LTE up to Rel. 13, for FDD systems, the CSI feedback framework is 'implicit' in the form of CQI/PMI/RI (and CRI in Rel. 13) derived from a codebook assuming SU transmission from eNB. Because of the inherent SU assumption while deriving CSI, this implicit CSI feedback is inadequate for MU transmission. On the other hand, NR system has been designed to be more MU-centric from its first release with high resolution Type-II codebook in addition to low resolution Type-I codebook.

Among various higher layer signaling from serving gNB to UE (as described further in REF6), a set of IEs related to this disclosure are described in the following.

To configure codebooks of Type-I and Type-II to a UE by the serving gNB using a higher layer signaling, the IE CodebookConfig is used: codebookType includes type1, type2 and possibly sub-types such as type1-SinglePanel, type1-MultiPanel, typeII, and typeII-PortSelection, and corresponding parameters for each type; n1-n2 is used to configure the number of antenna ports in first (n1) and second (n2) dimension (e.g., horizontal and vertical dimensions) and codebook subset restriction for type1-SinglePanel; ng-n1-n2 is used to configure the number of antenna panels (ng), the number of antenna ports in first (n1) and second (n2) dimension assuming that the antenna structure is identical for the configured number of panels, and codebook subset restriction for Type I Multi-panel codebook; n1-n2-codebookSubsetRestriction is used to configure the number of antenna ports in first (n1) and second (n2) dimension and codebook subset restriction for typeII; CodebookConfig-r17 includes type1-SinglePanel1-r17 and type1-SinglePanel2-r17 for type1, to allow configuring different antenna structures for two TRPs.

To indicate the resource element mapping of a CSI-RS resource in time- and frequency domain, the IE CSI-RS-ResourceMapping is used. The container includes elements for time- and frequency domain resource configuration such as firstOFDMSymbolInTimeDomain, firstOFDMSymbolIn-TimeDomain2, and frequencyDomainAllocation, the CSI-RS density, density, the number of ports, nrofPorts, among others. The IE CSI-RS-ResourceMapping comprises the NZP-CSI-RS-Resource and ZP-CSI-RS-Resource configurations, which are included in the CSI-ResourceConfig. The IE CSI-ResourceConfig defines a group of one or more NZP-CSI-RS-ResourceSet, CSI-IM-ResourceSet and/or CSI-SSB-ResourceSet.

The IE CSI-ReportConfig is used to indicate to a UE parameter for providing a periodic or semi-persistent CSI report via PUCCH transmissions on the cell where CSI-ReportConfig is included, or to indicate parameters for providing a semi-persistent or aperiodic CSI report on a PUSCH as triggered by a DCI that the UE receives. The CSI-ReportConfig is set for certain CSI-ResourceConfigId for channel/interference measurements. The aforementioned CodebookConfig is also part of CSI-ReportConfig.

For aperiodic CSI, both aperiodic CSI reporting and aperiodic CSI-RS transmission are triggered using a 'CSI Request' field within a DCI format scheduling a PUSCH transmission, such as DCI format 0_1. The 'CSI Request' field indicates a 'Trigger State' that points to a certain CSI-ReportConfigId and resourcesForChannel, e.g., NZP-CSI-RS-ResourceSet. The 'CSI Request' field can have up to 6 bits and can indicate up to 64 'Trigger States'. If a UE is configured with more than 64 'Trigger States', a 'Aperiodic CSI Trigger State Subselection' medium access control (MAC) element (CE) identifies a subset of Trigger States that are indicated by DCI.

For semi-persistent CSI on PUCCH, the semi-persistent CSI-RS resource is triggered by a "SP CSI-RS/CSI-IM Resource Set Activation/Deactivation" medium access control-control element (MAC CE) that includes a SP CSI-RS resource set ID indicating an index of NZP-CSI-RS-ResourceSet containing Semi Persistent NZP CSI-RS resources indicating the Semi Persistent NZP CSI-RS resource set, that is to be activated or deactivated. Semi-persistent CSI reporting on PUCCH is triggered using the "SP CSI reporting on PUCCH Activation/Deactivation" MAC CE. The field $S_i$ in the MAC CE indicates the activation/deactivation status of the Semi-Persistent CSI report configuration within csi-ReportConfigToAddModList. So refers to the report configuration that includes PUCCH resources for semi-persistent CSI reporting in the indicated BWP and has the lowest CSI-ReportConfigId within the list with type set to semi-PersistentOnPUCCH, $S_1$ refers to the report configuration that includes PUCCH resources for semi-persistent CSI reporting in the indicated BWP and has the second lowest CSI-ReportConfigId, and so on.

For semi-persistent CSI reporting on PUSCH, a CSI report is triggered using a 'CSI Request' field in a DCI format 0_1 with CRC scrambled by a SP-CSI-RNTI. The operating details are similar to those for an aperiodic CSI report.

For periodic CSI reporting, both reporting and periodic CSI-RS resources are configured and initiated by CSI-ReportConfig.

Present networks have limited capability to adapt an operation state in one or more of time/frequency/spatial/power domains. For example, in NR, there are transmissions or receptions by a serving gNB that are expected by UEs, such as transmissions of SS/PBCH blocks, or of system information, or of CSI-RS indicated by higher layers, or receptions of PRACH or SRS indicated by higher layers. Reconfiguration of a NW operation state involves higher layer signaling by a SIB or by UE-specific RRC. That is a slow process and requires substantial signaling overhead, particularly for UE-specific RRC signaling. For example, it is currently not practical or possible for a network in typical deployments to enter an energy saving state where the network does not transmit or receive due to low traffic as, in order to obtain material energy savings, the network needs to suspend transmissions or receptions for several tens of milliseconds and preferably for even longer time periods. A similar inability exists for suspending transmission or receptions for shorter time periods as a serving gNB may need to frequently transmit SS/PBCH blocks, such as every 5 msec or every 20 msec and, in TDD systems with UL-DL configurations having few UL symbols in a period, the serving gNB may need to receive PRACH or SRS in most UL symbols in a period.

Due to the above reasons, adaptation of a NW operation state is typically over long time periods, such as for off-peak hours when an amount of served traffic is small and for peak hours when an amount of served traffic is large. Therefore, a capability of a gNB to improve service by fast adaptation of a NW operation state to the traffic types and load, or to save energy by switching to a state that requires less energy consumption when an impact on service quality would be limited or none, is currently limited as there are no procedures for a serving gNB to perform fast adaptation of a NW operation state with small signaling overhead while simultaneously informing all UEs of the NW operation state.

It is also beneficial to support a gradual transition of NW operation states between a maximum state where the NW operates at its maximum capability in one or more of a time/frequency/spatial/power domain and a minimum state where the NW operates at its minimum capability, or the NW enters a sleep mode. That would allow continuation of service while the NW transitions from a state with larger utilization of time/frequency/spatial/power resources to a state with lower utilization of such resources and the reverse as UEs can obtain time/frequency synchronization and automatic gain controller (AGC) alignments, perform measurements and provide CSI reports or transmit SRS prior to scheduling of PDSCH receptions or PUSCH transmissions.

In order to enable a gNB to sleep and save energy while minimizing an impact on served UEs, the gNB can apply cell discontinuous transmission (DTX) or cell discontinuous reception (DRX) on a serving cell. UEs in the cell can be informed of corresponding cell DTX/DRX configurations such that the UEs can operate accordingly and avoid power consumption when the serving gNB is in dormancy (cell DTX/DRX). By turning off all or a part of a transmission chain and pausing transmission during the cell DTX, the gNB can reduce energy consumption for standby when there is little to no traffic. For cell DTX, a UE may assume that all transmissions from a serving gNB are suspended or the UEs may assume that some signals, such as PSS or SSS for maintaining synchronization, remain present during cell DTX. By turning off all or a part of receiver chain and pausing receptions during the cell DRX, the gNB can reduce energy consumption for standby when there is little to no traffic. For cell DRX, a UE may assume that all transmissions from the UE are suspended or may assume that some transmissions, such as ones required for initial access such as PRACH, are allowed during a cell DRX duration.

Figure 10:
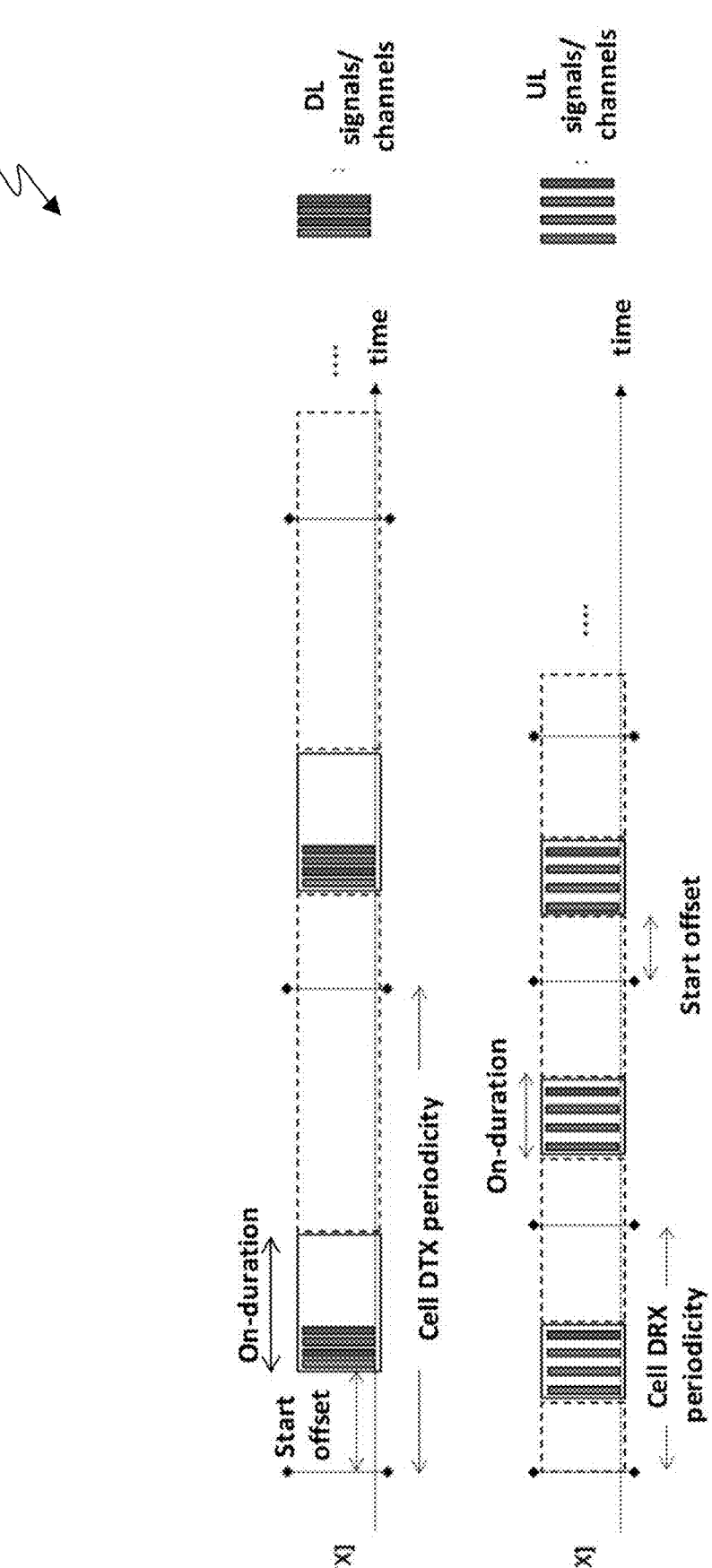
FIG. 10 illustrates an example diagram of cell discontinuous transmission (DTX) and cell discontinuous reception (DRX) according to embodiments of the present disclosure.

FIG. 10 illustrates a diagram 1000 of cell DTX/DRX according to embodiments of the present disclosure. The embodiment of the diagram 1000 illustrated in FIG. 10 is for illustration only. FIG. 10 does not limit the scope of this disclosure to any particular implementation.

As illustrated in FIG. 10, cell DTX/DRX can be configured via at least a periodicity, a start slot/offset, and an on-duration. A UE assumes that all transmissions/receptions by the gNB are enabled during the DTX/DRX on-duration, respectively. The configurations and operations of cell DTX and cell DRX can be linked or can be separate, for example depending on DL/UL traffic characteristics.

The energy consumption by power amplifiers (PA) for each set of antenna elements (AEs) accounts for a large portion of total energy consumption by a gNB equipped with massive MIMO antennas. For network energy savings, when the traffic load is low, the gNB can turn off a subset of PAs or reduce the PA output power levels. For brevity, such operation is respectively referred to as spatial domain (SD) or power domain (PD) adaptation in this embodiment of the disclosure. Unlike cell DTX/DRX illustrated in FIG. 9, one advantage of SD/PD adaptation is that the network can maintain continuity of transmissions and receptions without interruptions by operating at a reduced capability.

Figure 11:
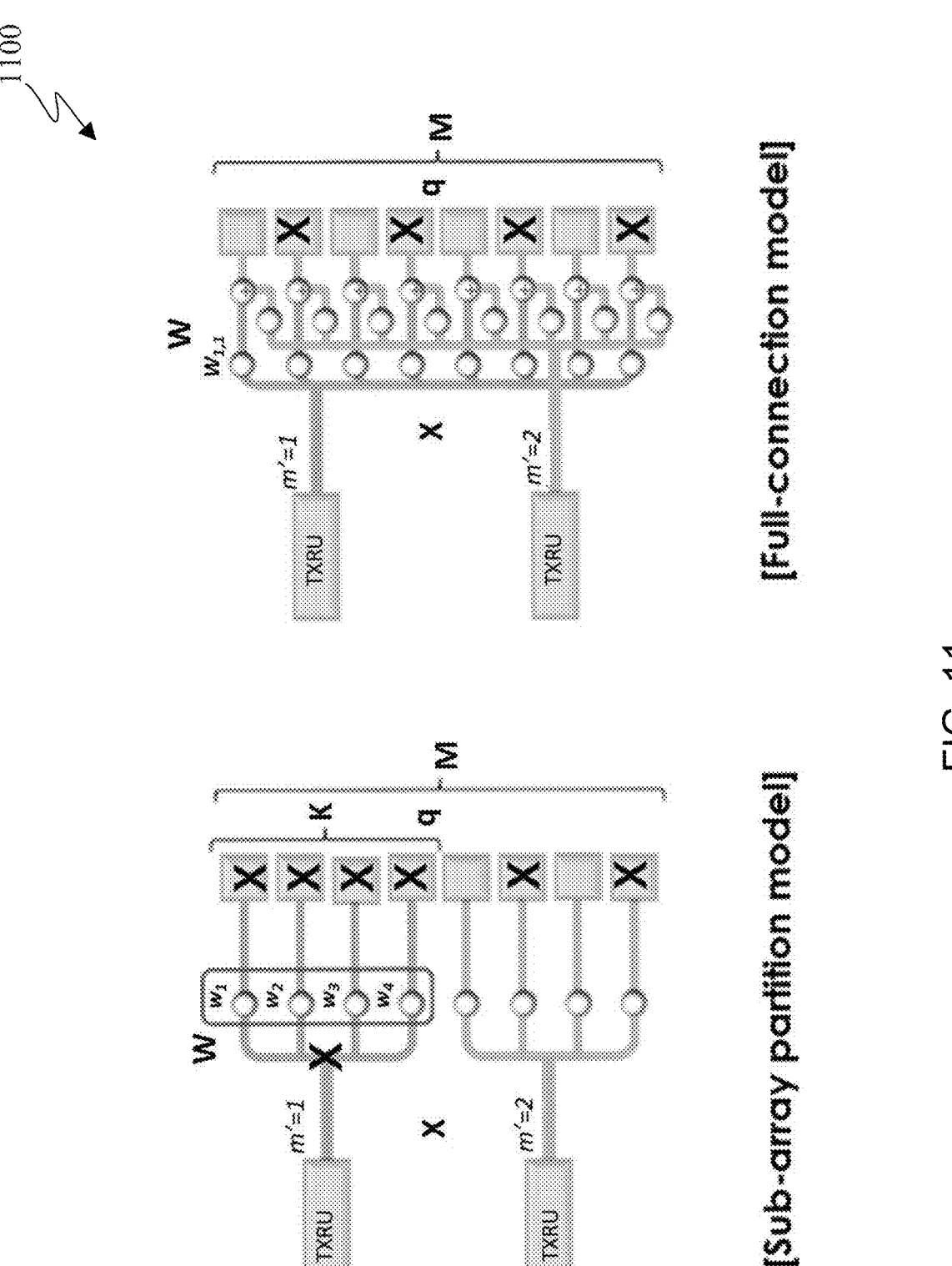
FIG. 11 illustrates an example diagram of spatial element adaptation according to embodiments of the present disclosure.

FIG. 11 illustrates a diagram 1100 of spatial element adaptation according to embodiments of the present disclosure. The embodiment of the diagram 1100 illustrated in FIG. 10 is for illustration only. FIG. 11 does not limit the scope of this disclosure to any particular implementation.

A gNB can enable/disable all AEs associated to a logical antenna port or enable/disable a subset of AEs associated to a logical antenna port. For brevity, those adaptations of AEs are respectively referred to as Type 1 and Type 2 SD adaptations in this embodiment of the disclosure. The gNB may perform Type 1 SD adaptation, or Type 2 SD adaptation, or both.

In a hybrid beamforming system as illustrated in FIG. 9, one antenna port is connected to a large number of AEs that can be controlled by a bank of analog phase shifters, which is referred to as TxRU virtualization. The TxRU virtualization can be implemented based on sub-array partition model, full-connection model, or combinations of them, as illustrated in FIG. 11. In a sub-array partition model, spatial element adaptations can result in both Type 1 and Type 2 SD adaptations. In case of Type 1 SD adaptation, both the PAs connected to AEs associated to a logical antenna port and the subsequent RF chain, e.g., ADC/DAC, etc., associated to the logical antenna port can be turned off. In a full-connection model, spatial element adaptations can only result in Type 2 SD adaptations unless all the antenna ports are turned off.

The impact of Type 1 SD adaptation results in a change in the number of active antenna ports or antenna structure in general. The RF characteristics, e.g., radiation power, beam pattern, etc., of remaining antenna ports remain same. The impact of Type 2 SD adaptation results in a change in the RF characteristics of antenna ports affected by AE on/off while the number of antenna ports remains the same. The impact of PD adaptation is similar to Type 2 SD adaptation. A gNB can perform any combination of Type 1 SD, Type 2 SD, and PD adaptations together with other time/frequency domain adaptation techniques such as cell DTX/DRX.

The serving gNB's SD/PD adaptation can result in a change in the number of active antenna ports and/or in a change in the RF characteristics of antenna ports. Therefore, as this disclosure recognizes, there is a need for defining procedures and methods to provide hypotheses on the CSI-RS resource adaptations and to perform corresponding measurements and reports as a number of CSI-RS ports, a CSI-RS transmission power, and/or a PDSCH transmission power changes.

According to different SD adaptation hypotheses by a gNB, a number of active antenna ports, or an antenna structure in general, can change. Therefore, for correct CSI reporting from a UE, there is a need for defining procedures and methods to provide corresponding codebook configurations associated with different SD adaptation hypotheses.

This disclosure also recognizes there is another need for defining procedures and methods to enable updates to parameters of a CSI-RS resource configuration and an associated CSI report configuration when a serving gNB performs SD/PD adaptations.

The CSI resource/report parameter updates per SD/PD adaptation can be indicated to UEs using UE-specific, UE-group specific or cell-specific DCI. Therefore, as this disclosure recognizes, there is a need for designing an efficient DCI signaling for providing SD/PD adaptations when UE-specific, UE-group specific or cell-specific DCI is used.

A network may want to assess an impact of parameter adaptation prior to executing an actual parameter adaptation. Therefore, as this disclosure recognizes, there is a need for defining procedures and methods to enable multiple CSI reports for different hypotheses of parameter adaptation. For providing multiple CSI reports corresponding to multiple SD/PD parameters in one PUCCH or PUSCH transmission by treating each CSI report independently of the other CSI reports, a total payload size for the multiple CSI reports would increase linearly with the number of reports and that can lead to excessive overhead or an inability to reliably provide the multiple CSI reports due to the large payload size. Therefore, there is yet another need to enhance to reduce the total payload for multiple CSI reports associated with adaptation of SD/PD parameters on a serving cell. Further, a PUCCH resource available for a PUCCH transmission with multiple CSI reports for adaptation of SD/PD parameters may not be sufficient to result to a code rate that is smaller than or equal to a configured or indicated code rate for uplink control information (UCI) in the PUCCH. In such case, the UE may need to drop some UCI, such as some of the multiple CSI reports, in order for a resulting code rate to be smaller than or equal to a configured or indicated code rate or maximum code rate. Therefore, there is yet another need to define prioritization rules for providing multiple CSI reports associated with adaptations of SD/PD parameters when some of the multiple CSI reports need to be dropped.

A DCI format providing SD/PD adaptation can have a size different than sizes of existing DCI formats. Given the limit for number of sizes of DCI formats that a UE can decode from PDCCH receptions per cell, there is yet another need to design a DCI format that provides SD/PD adaptation under a present restriction while minimizing or avoiding an increase in size of other DCI formats that the UE monitors corresponding PDCCH.

When the UE received a DCI format providing SD/PD adaptation, there is an ambiguity from when the UE shall apply the indicated adaptation. Therefore, there is yet another need to define procedures and methods to align the application time of the indicated SD/PD adaptation between the serving gNB and the UE.

As will be further elaborated below, this disclosure provide methods and apparatuses for enabling a serving gNB to perform spatial or power domain adaptations, for example in order to support network energy savings, summarized in the following: for a gNB to provide a candidate set of CSI-RS resource configurations for a corresponding CSI report configuration by higher layer signaling and to indicate a CSI-RS resource configuration, from the candidate set of CSI-RS resource configurations, by L1, L2, or higher layer signaling; for a gNB to provide a candidate set of parameters for a corresponding CSI-RS resource configuration by higher layer signaling and to indicate parameters from the candidate set of parameters by L1, L2, or higher layer signaling; for a gNB to provide a candidate set of codebook configurations, for a corresponding CSI report configuration by higher layer signaling and to indicate a configuration from the candidate set of codebook configurations by L1, L2, or higher layer signaling; for a gNB to provide multiple hypotheses for a CSI report, including a codebook configuration, a power of a CSI-RS transmission, and a power of a PDSCH transmission, by higher layer signaling and to trigger a CSI report that includes multiple individual CSI reports for the multiple hypotheses, via L1, L2, or higher layer signaling; for designing an efficient DCI signaling for providing SD/PD adaptations in UE-specific, UE-group specific and cell-specific manners; for reducing an overhead associated with multiple CSI reports from a UE that correspond to multiple SD/PD parameters for transmissions from a gNB on a serving cell via differential reports, thresholding, and reusing a basis set for precoding-matrix indicator (PMI) feedback; for a UE to prioritize multiplexing of CSI reports in a PUCCH, including multiple CSI reports associated with multiple configurations of parameters in a spatial domain or power domain for transmissions from a gNB, when a corresponding PUCCH resource cannot support a configured or indicated code rate for a UCI that includes the multiple CSI reports; for designing a DCI format indicating SD/PD adaptation under a present restriction on a number of sizes of DCI formats that a UE can decode; and for aligning the application time of the indicated SD/PD adaptation between the serving gNB and the UE.

The framework for CSI enhancements for SD/PD adaptations includes enhancements for CSI reporting involving multiple CSI sub-reports corresponding to different hypotheses of CSI-RS resource adaptation in SD/PD domain. The enhancement includes a serving gNB indicating to a UE one or more CSI report sub-configurations corresponding to one or more SD/PD adaptation hypotheses as a number of CSI-RS ports changes, or as a power for CSI-RS transmission changes, or as a power for PDSCH transmission relative to a power for CSI-RS transmission changes. The signaling for indicating a CSI report sub-configuration, from an indicated set of CSI report sub-configurations, can be via a PDCCH providing DCI that includes a field indicating the CSI report sub-configuration, or via a PDSCH providing MAC-CE or RRC information. The signaling can be UE-specific, UE-group-specific, or cell-specific. For example, a UE can monitor PDCCH for detection of a DCI format indicating the CSI report sub-configuration, or for a DCI format scheduling a PDSCH reception with the MAC CE or RRC information, according to a CSS set or a USS set.

The enhancement for CSI reporting further includes a serving gNB indicating to a UE one or more CSI codebook configurations corresponding to one or more hypotheses as a number of CSI-RS ports changes. The signaling for indicating the CSI codebook configuration can be via a PDCCH providing a DCI format with a corresponding field, or via a PDSCH providing MAC-CE or RRC information. The UE can monitor PDCCH for detection of the DCI format indicating the CSI codebook configuration, or of the DCI format scheduling a PDSCH reception with the MAC CE or RRC information, according to a CSS set or a USS set. The enhancement for CSI reporting also includes a serving gNB indicating to a UE a number of hypotheses on adaptation/configuration of CSI-RS resources, corresponding to SD/PD adaptations, and the UE providing to the serving gNB a number of CSI reports according to the indicated hypotheses. The number of CSI reports can be same as the number of hypotheses or can be up to an indicated number, for example by DCI, MAC-CE, or RRC information, that is smaller than the number of hypotheses in order to reduce an overhead for the UE to report the CSI. For example, the UE can provide a first CSI report corresponding to a current configuration of CSI-RS resources and a second CSI report corresponding to a configuration of CSI-RS resources, from the CSI-RS configurations associated with the hypotheses and other than the current configuration, that result to a largest channel quality indicator (CQI) value or to a largest rank for PDSCH receptions. The second CSI report can be a separate report or can be with differential values, for example for the CQI or for the rank, relative to the first CSI report.

FIG. 12 illustrates a flowchart of a method 1200 for a UE to receive CSI report configurations and provide respective CSI reports according to embodiments of the present disclosure. The embodiment of the flowchart of method 1200 illustrated in FIG. 12 is for illustration only. FIG. 12 does not limit the scope of this disclosure to any particular implementation.

At 1210, A UE is provided from a serving gNB by a higher layer signaling a first number of CSI report configurations, where each configuration includes a number of CSI-RS resource configurations, codebook configurations, CSI-RS to SSB power offsets, or CSI-RS to PDSCH power offsets. At 1220, the UE receives an indication from the serving gNB for a second number of indexes of CSI-RS resource configurations, codebook configurations, or CSI-RS to PDSCH power offsets from the set of configurations via L1, L2, or RRC information for a corresponding CSI report configuration. At 1230, the UE provides a third number of CSI reports, for a third number from the second number of indexes, according to the indication to the serving gNB. The third number can be indicated by L1, MAC CE, or RRC information.

Enhancements to CSI-RS resource adaptation includes a serving gNB indicating to a UE CSI-RS resource configurations as hypotheses of network adaptation in SD/PD, such as a number of CSI-RS ports changes, or a power for CSI-RS transmission changes, or a power for PDSCH transmission relative to a power for CSI-RS transmission changes.

The CSI-ResourceConfig indicates a CSI-RS resource set where each NZP-CSI-RS-Resource provides at least resourceMapping, such as the parameters indicating a number of CSI-RS ports nrofPorts, code-division multiplexing (CDM) type cdm-Type, a power offset of PDSCH RE to NZP CSI-RS RE powerControlOffset, and a power offset of NZP CSI-RS RE to SSS RE powerControlOffsetSS. The CSI-ResourceConfig also indicates whether the provided resource is aperiodic, semi-persistent, or periodic.

FIG. 13 illustrates a block diagram 1300 of CSI-RS resource adaptation as a number of active CSI-RS ports changes according to embodiments of the present disclosure. The embodiment of the diagram 1300 illustrated in FIG. 13 is for illustration only. FIG. 13 does not limit the scope of this disclosure to any particular implementation.

In step 1210 of FIG. 12, a UE (e.g., UE 116) is provided from a serving gNB by higher layers a number of SD/PD adaptation hypotheses, i.e., CSI-RS resource configurations, as a part of a CSI report configuration. The number of CSI-RS resource configurations provided to the UE can be an entirety of parameters necessary to configure a CSI-RS resource, or a subset of those parameters such as resourceMapping, powerControlOffset, powerControlOffsetSS, or periodicityAndOffset. The multiple CSI-RS resource configurations for a corresponding CSI report configuration are associated with different SD/PD adaptation hypotheses. In one example, a value of resourceMapping in one CSI-RS resource configuration can be different from a value in another CSI-RS resource configuration in the CSI report configuration as exemplified in FIG. 13. In another example, a value of powerControlOffset in one CSI-RS resource configuration can be different from a value in another CSI-RS resource configuration in the CSI report configuration. In yet another example, a value of power-ControlOffsetSS in one CSI-RS resource configuration can be different from a value in another CSI-RS resource configuration in the CSI report configuration. The UE (e.g., UE 116) is indicated from the serving gNB by higher layers a default CSI-RS resource configuration, among the set of configurations, that is assumed to be activated when a CSI report is triggered via DCI, MAC CE, or RRC information.

In step 1220 of FIG. 12, a serving gNB (e.g., gNB 103) triggers a UE to report CSI including one or more CSI sub-reports by indicating the corresponding one or more CSI report sub-configuration indexes from the set of configurations provided by higher layers for a corresponding CSI report configuration in step 1210 to the UE. The indication for the index(es) can be provided via L1, L2, or RRC information. A PDCCH providing a DCI format indicating the one or more indexes or scheduling a PDSCH that includes a MAC CE or RRC information for the one or more indexes, can be received according to a CSS set or according to a USS set. The UE can provide a periodic, semi-persistent, or aperiodic CSI report on a PUCCH or on a PUSCH and the CSI report can be associated with periodic, semi-persistent and/or aperiodic CSI-RS resources.

In one example, the UE (e.g., UE 116) receives an indication from the serving gNB for one or more indexes to CSI report sub-configurations, from the set of configurations provided in the CSI report configuration by higher layers, via a PDCCH providing DCI indicating a trigger state defining a set of CSI report sub-configurations, which is also provided by higher layers. An existing DCI format can be used, or a new DCI format can be defined. For instance, for a semi-persistent or an aperiodic CSI report on PUSCH, DCI format 0_1 can indicate an index to a trigger state, which refers to a subset of CSI report sub-configurations from the set of CSI report sub-configurations associated with the CSI report.

An index to a trigger state can be provided by a UE-group-specific DCI format (provided by PDCCH that a UE monitors according to a CSS set). The DCI format can include blocks of information and the UE is provided a starting position for a block via higher layers. The information provided in the block for the UE (e.g., UE 116) can include an index to a trigger state from the set of trigger states, wherein a state is associated with a subset of CSI report sub-configurations from the set of sub-configurations and the corresponding CSI report configuration ID.

In another example, the UE (e.g., UE 116) receives an indication from a serving gNB (e.g., gNB 103) for one or more indexes to CSI report sub-configurations, from the set of configurations provided in the CSI report configuration by higher layers, via PDSCH providing MAC-CE together with the CSI report configuration ID. An existing MAC-CE format can be extended to include additional fields to indicate those indexes, or a new MAC-CE format can be defined. For instance, for a semi-persistent CSI report on PUCCH, the 'SP CSI reporting on PUCCH Activation/Deactivation' MAC CE can be extended to include a field indicating an index to a CSI-RS resource configuration, from the set of configurations for the CSI report configuration, by the field Si.

As another example, a UE (e.g., UE 116) can be indicated from a serving gNB an index to a CSI report sub-configuration, from the set of configurations provided in the CSI report configuration, via PDSCH providing RRC information together with a CSI report configuration ID. For example, for a periodic CSI report, the UE can be indicated from the serving gNB one or more CSI report sub-configurations, among the set of configurations provided by higher layers for a corresponding CSI report configuration, or the RRC information can directly indicate the corresponding CSI report configuration.

At step 1230, once the UE (e.g., UE 116) receives an indication for one or more indexes to CSI report sub-configurations, from the set of configurations for a corresponding CSI report configuration, the UE reports CSI including one or more CSI sub-reports corresponding to sub-configurations accordingly to the serving gNB.

In step 1210 of FIG. 12, a UE is provided from a serving gNB by higher layers a candidate set of values for parameters associated with a CSI-RS resource configuration corresponding to SD/PD adaptations, such as resourceMapping, powerControlOffset, or powerControlOffsetSS. For example, a CSI-RS resource can be configured with a candidate set of resourceMapping configurations and with an indication to a default configuration. As another example, a CSI-RS resource can be configured with a candidate set of powerControlOffset values and with an indication to a default value. Alternatively, a CSI-RS resource can be configured with a default powerControlOffset value, and a candidate set of adjustment values to the default value, i.e., a set of A dB values. As yet another example, a CSI-RS resource can be configured with a candidate set of power-ControlOffsetSS values and with an indication to a default value. Alternatively, a CSI-RS resource can be configured with a default powerControlOffsetSS value, and a candidate set of adjustment values to the default value, i.e., a set of ±Δ dB values. The candidate sets of parameter values can be provided as a part of CSI report configuration.

In step 1220 of FIG. 12, as the serving gNB adapts an operation state, the serving gNB indicates an update to a current CSI-RS resource by indicating an index from the candidate set of parameter values or adjustment values provided by higher layers in step 1210 to the UE. The signaling can be provided via L1, MAC CE, or RRC information. A PDCCH providing a DCI format indicating the index or scheduling a PDSCH that includes a MAC CE or RRC information for the index, can be received according to a CSS set or according to a USS set. The UE can provide a periodic, semi-persistent, or aperiodic CSI report on a PUCCH or on a PUSCH and the CSI report can be associated with periodic, semi-persistent and/or aperiodic CSI-RS resources.

In one example, a UE (e.g., UE 116) receives an indication from a serving gNB (e.g., 102) for one or more indexes, from the candidate sets of parameter values or adjustment values, via a PDCCH providing DCI together with a CSI-RS resource configuration ID or a CSI report configuration ID. An existing DCI format can be extended to include additional fields to indicate those indexes, or a new DCI format can be defined. For instance, in the case of semi-persistent or aperiodic CSI report on PUSCH, DCI format 0_1 can be extended to include fields indicating one or more indexes from the candidate sets of parameter values or adjustment values, that is applied to the CSI-RS resource configuration pointed by 'Trigger State' indicated by a 'CSI request' field in DCI format 0_1.

An index to a set of parameter values or adjustment values, from the candidate sets of parameter values or adjustment values, can be provided by a UE-group-specific DCI format (provided by PDCCH that a UE monitors according to a CSS set). The DCI format can include blocks of information and the UE is provided a starting position for a block via higher layers. The information provided in the block for the UE can include a number of indexes from the candidate sets of parameter values or adjustment values and the corresponding CSI report configuration ID.

In another example, a UE (e.g., UE 116) receives an indication from a serving gNB for a number of indexes, from the candidate sets of parameter values or adjustment values, via a PDSCH providing a MAC-CE together with a CSI-RS resource configuration ID or a CSI report configuration ID. An existing MAC-CE format can be extended to include additional fields to indicate those indexes, or a new MAC-CE type can be defined. As an example, for semi-persistent CSI-RS resource that can be utilized for semi-persistent and aperiodic CSI reporting, 'SP CSI-RS/CSI-IM Resource Set Activation/Deactivation'MAC CE can be extended to include a field indicating a number of indexes from the candidate sets of parameter values or adjustment values, to be applied to the CSI-RS resource configuration pointed by the field 'SP CSI-RS resource set ID'. As another example, for semi-persistent CSI reporting on PUCCH that can be associated with a periodic or semi-persistent CSI resource, the 'SP CSI reporting on PUCCH Activation/Deactivation' MAC CE can be extended to include a field indicating a number of indexes from the candidate sets of parameter values or adjustment values, to be applied to the CSI-RS resource configuration indicated as a part of CSI report configuration pointed by the field $S_i$.

In yet another example, a UE receives an indication from a serving gNB for a number of indexes from the candidate sets of parameter values or adjustment values, via PDSCH providing RRC information to be applied to the CSI-RS resource configuration together with the CSI-RS resource configuration ID or the CSI report configuration ID. For example, for a periodic CSI report, the UE can be provided from the serving gNB an update to the CSI-RS resource configuration via a number of indexes from the candidate sets of parameter values or adjustment values, or the RRC information can directly reconfigure the corresponding CSI report configuration.

An adaptation of a power of CSI-RS transmission or a power of PDSCH transmission can be signaled to UEs (e.g., UE 111, UE 112, and UE 114) via UE-specific, UE-group-specific, or cell-specific DCI. As an example of UE-specific DCI, the UE can be provided from the serving gNB via PDCCH providing a DCI format indicating a value of powerControlOffset (or powerControlOffsetSS) in dB or via an index from the set of pre-defined values, e.g., by specifications, or from the set of candidate values provided by higher layer signaling. As another example of UE-specific DCI, the UE can be provided from the serving gNB via PDCCH providing a DCI format indicating an adjustment value, e.g., ±Δ dB, to a current value of powerControlOffset (or powerControlOffsetSS), where the adjustment value can be indicated in dB or via an index from the set of pre-defined values or from the set of candidate values provided by higher layer signaling. The UE then updates the value of power-ControlOffset (or powerControlOffsetSS) by adding the indicated adjustment value, ±Δ dB, to the current value of powerControlOffset (or powerControlOffsetSS).

As an example of UE-group specific DCI, K blocks of information can be included in the DCI for a group of K UEs, where each UE is provided a starting position for its own block via higher layer signaling. Each block can include a field indicating values similar to the examples of UE-specific DCI, i.e., a value of powerControlOffset (or pow-erControlOffsetSS) or an adjustment value to a current value of powerControlOffset (or powerControlOffsetSS), for the corresponding UE. As another example of UE-group spe-cific DCI, N blocks of information can be included in the DCI for N number of UE subgroups, where each UE is indicated its subgroup index that it belongs from the serving gNB by higher layer signaling. Each block can include a field indicating values similar to the examples of UE-specific DCI, i.e., a value of powerControlOffset (or powerControlOffsetSS) or an adjustment value to a current value of powerControlOffset (or powerControlOffsetSS) that is commonly applied to all UEs in the group. For the case when the UE-group specific DCI indicates an adjustment value to a current value of powerControlOffset (or powerControlOffsetSS), each UEs update the value of powerControlOffset (or powerControlOffsetSS) by adding the indicated adjustment value, ±Δ dB, to its own current value of powerControlOffset (or powerControlOffsetSS) which may differ from one UE to another.

As an example of cell-specific DCI, which is also applicable as an example for UE-group specific DCI, UEs in a cell (or in a group) (e.g., UE 111, UE 112, and UE 113) can be assigned with a dedicated RNTI such as a NW energy saving RNTI (NES-RNTI) for monitoring PDCCH providing DCI for indicating a value of powerControlOffset (or powerControlOffsetSS) or an adjustment value to a current value of powerControlOffset (or powerControlOffsetSS) that is commonly applied to all UEs in the cell (or in the group). For the case when the cell-specific DCI (or UE-group specific DCI) indicates an adjustment value to a current value of powerControlOffset (or powerControlOffsetSS), each UEs update the value of powerControlOffset (or powerControlOffsetSS) by adding the indicated adjustment value, ±Δ dB, to its own current value of powerControlOffset (or powerControlOffsetSS) which may differ from one UE to another.

At step 1230, once the UE (e.g., 116) receives an update to a current CSI-RS resource configuration, the UE reports CSI accordingly to the serving gNB.

Enhancements to CSI reporting includes a serving gNB indicating to a UE a CSI codebook configuration as a number of CSI-RS ports changes. Enhancement to CSI reporting also includes a serving gNB indicating to a UE a first number of hypotheses on CSI-RS resource adaptation and the UE providing to the serving gNB a second number of CSI reports according to the indicated hypotheses on CSI-RS resource adaptation.

Figures 14, 15:
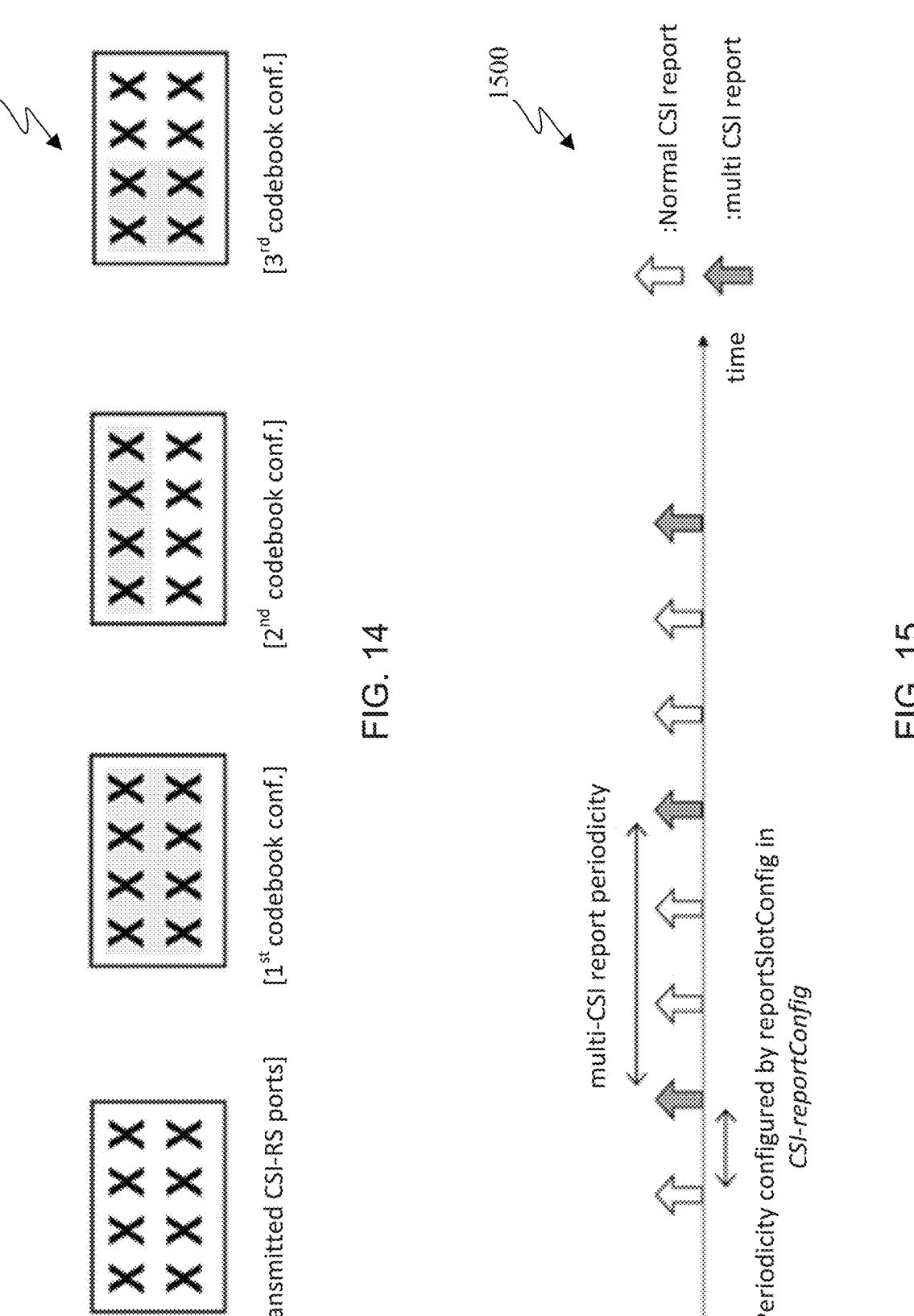
FIG. 14 illustrates an example diagram of CSI codebook hypotheses for CSI report according to embodiments of the present disclosure.
FIG. 15 illustrates an example diagram of multi-CSI report configuration according to embodiments of the present disclosure.

FIG. 14 illustrates a diagram 1400 of examples of possible codebook hypotheses for a UE to generate a CSI report for a corresponding CSI-RS resource according to embodiments of the present disclosure. The embodiment of the diagram 1400 illustrated in FIG. 14 is for illustration only. FIG. 14 does not limit the scope of this disclosure to any particular implementation. The examples of possible codebook hypotheses may be generated by, for example, UE 116.

A CodebookConfig provided as a part of CSI report configuration provides parameters associated with PMI reporting. For example, CodebookConfig provides a codebook type from Type-I and Type-II codebooks including their subtypes such as Type-I single-panel, Type-I multi-panel, Type-II normal, and Type-II port selection codebooks. For a given codebook type, the configuration also provides a number of antenna ports, or a 2-dimensional structure in general, and the subsequent codebook subset restriction (CBSR) and rank indication restrictions.

In step 1210 of FIG. 12, a UE (e.g., UE 111) is provided from a serving gNB (e.g., gNB 102) by higher layers a number of codebook configurations for a corresponding CSI report configuration. The multiple codebook configurations provided to the UE can be all IEs necessary to configure a codebook, or a subset of the IEs to provide an update to the codebook configured to the UE. For instance, the update can be for a number of antenna ports, antenna structure, or number of panels, e.g., n1-n2, ng-n1-n2, n1-n2-codebook-SubsetRestriction, for a given type1-SinglePanel, type1-MultiPanel, and typeII codebook configurations, respectively. As another example, the update can be to a RI restriction or CBSR to a codebook that is configured to the UE.

To reduce signaling overhead for indicating an antenna structure for a codebook, an active set of antenna ports (or similarly dormant set of antenna ports) for CSI feedback can be indicated in terms of geometry, e.g., upper-half, lower-half, left-half, right-half, upper-left-quarter, upper-right-quarter, lower-left-quarter, lower-right-quarter, etc., as illustrated in FIG. 14. As another example of reducing signaling overhead, the active set of antenna ports (or similarly dormant set of antenna ports) for CSI report can be indicated in terms CDM group, e.g., cdm-group-1, cdm-group-2, . . . .

The multiple codebook configurations provided in a corresponding CSI report configuration can be associated with different SD adaptation hypotheses involving antenna port level on/off. The UE is indicated from the serving gNB a default codebook configuration, among the set of configurations provided by higher layers, that is the UE assumes when the CSI report is triggered via DCI, MAC CE, or RRC information, unless the UE is otherwise indicated to use a different codebook configuration.

In step 1220 of FIG. 12, as the serving gNB adapts its operation state, the serving gNB provides an update to a codebook configuration by indicating an index from the candidate set of configurations provided by higher layers in step 1210 to the UE. A PDCCH providing a DCI format indicating the index or scheduling a PDSCH that includes a MAC CE or RRC information for the index, can be received according to a CSS set or according to a USS set. The UE can provide a periodic, semi-persistent, or aperiodic CSI report on a PUCCH or on a PUSCH and the CSI report can be associated with periodic, semi-persistent and/or aperiodic CSI-RS resources.

For example, the UE receives an indication from the serving gNB for a number of indexes from the candidate sets of codebook configurations via PDCCH providing DCI together with CSI report configuration ID. In one example, the UE may assume the indicated codebook for the CSI report until the UE receives another indication. In another example, the UE may assume that the indicated codebook is valid only for the next CSI report. The DCI may include a field indicating the validity duration of the indicated codebook, e.g., one time, a fixed duration, or until a next indication is received. An existing DCI format can be extended to include additional fields to indicate those indexes, or a new DCI type can be defined. For instance, for a semi-persistent or an aperiodic CSI report on PUSCH, DCI format 0_1 can be extended to include fields indicating a codebook index and/or validity duration to be applied to the CSI report configuration pointed by 'Trigger State' indicated using 'CSI request' field in the DCI.

An index to a set of codebook configurations, from the candidate sets of codebook configurations, can be provided by a UE-group-specific DCI format (provided by PDCCH that a UE monitors according to a CSS set). The DCI format can include blocks of information and the UE is provided a starting position for a block via higher layers. The information provided in the block for the UE can include a number of indexes from the candidate sets of codebook configurations.

The UE may receive an indication from the serving gNB for a number of indexes, from the candidate sets of codebook configurations, via a PDSCH providing a MAC-CE providing the indication together with the CSI report configuration ID. In one example, the UE assumes the indicated codebook for the CSI report until the UE receives another indication. In another example, the UE assumes that the indicated codebook is valid only for the next CSI report. The MAC-CE may include a field indicating the validity duration of the indicated codebook, e.g., one time, a fixed duration, or until receiving a next indication. An existing MAC-CE type can be extended to include additional fields to indicate those indexes, or a new MAC-CE type can be defined. As an example, in the case of semi-persistent CSI reporting on PUCCH, the 'SP CSI reporting on PUCCH Activation/Deactivation' MAC CE can be extended to include fields indicating a codebook index and/or validity duration, that is applied to the codebook configuration indicated as a part of CSI report configuration pointed by the field $S_i$.

At step 1230, once the UE receives an update for a CSI-RS resource configuration, the UE reports CSI accordingly to the serving gNB.

A UE (e.g., UE 116) can be provided from the serving cell by higher layers a first number of hypotheses for CSI reporting including but not limited to codebookConfig, powerControlOffset, or powerControlOffsetSS. The UE provides a second number of CSI reports according to the indicated hypotheses. The UE can derive the second number of CSI reports from one set of CSI-RS measurements or from multiple sets of CSI-RS measurements. For example, as illustrated in FIG. 12, there can be an actual CSI-RS transmission from a set of antenna ports, while the UE can be indicated multiple CSI codebook configurations including a subset of the set of antenna ports. The UE can then derive multiple CSI reports based on a single CSI-RS measurement.

As another example, the CSI-RS can be transmitted with a power indicated by powerControlOffsetSS in NZP-CSI-RS-Resource configuration, while the UE can be also indicated to a first number of hypothetical values of powerControlOffsetSS, or a set of A dB offset values to the indicated powerControlOffsetSS. The UE can then derive a second number of CSI reports by adjusting the actual L1 measurements such as RSRP, RSRQ, RSSI, SINR by the difference between an actual powerControlOffsetSS value and a hypothetical powerControlOffsetSS value. Similarly, the UE can be indicated a third number of hypothetical values of powerControlOffset, or a set of $\pm\Delta$ dB offset values to the indicated powerControlOffset, in NZP-CSI-RS-Resource configuration. The UE can then derive a fourth number of CSI reports by assuming different PDSCH transmission power offset values from the measured CSI-RS.

An indication to a UE (e.g., UE 116) to provide a number of CSI reports, and any other associated indications, can be provided by L1, MAC CE, or RRC information. A PDCCH providing a DCI format providing the indication or scheduling a PDSCH that includes a MAC CE or RRC information for the index, can be received according to a CSS set or according to a USS set. The UE can provide a periodic, semi-persistent, or aperiodic CSI report on a PUCCH or on a PUSCH and the CSI report can be associated with periodic, semi-persistent and/or aperiodic CSI-RS resources. A first minimum processing time for the UE to provide the number of CSI reports can be larger than a second minimum processing timeline for the UE to provide a CSI report for a current CSI-RS configuration and smaller than a multiple of the number of CSI reports times the second minimum processing timeline.

In one example, a UE (e.g., UE 116) receives an indication from a serving gNB (e.g., 103) for whether or not to report a number of CSI reports via PDCCH providing DCI together with a corresponding CSI report configuration ID. The UE may be further indicated a list of hypotheses, e.g., via a bitmap, for the UE to include in the number of CSI reports together with parameter configurations for each hypothesis. The DCI may also indicate whether the triggering for the number of CSI reports is only for a next CSI report occasion or for all subsequence CSI report occasions until deactivated. An existing DCI format, such as DCI format 0_1, can be extended to include additional fields to indicate those indexes or a new DCI format can be defined. The indication for the multiple CSI reports can be provided by a UE-group-specific DCI format (provided by PDCCH that a UE monitors according to a CSS set). The DCI format can include blocks of information and the UE is provided a starting position for a block via higher layers. The information provided in the block for the UE can include a number of indexes for the multiple CSI reports.

In another example, the UE (e.g., UE 116) receives an indication from the serving gNB (e.g., gNB 103) for whether or not to provide a number of CSI reports via PDSCH providing MAC-CE together with the corresponding CSI report configuration ID. The information elements conveyed over the MAC-CE message can be similar to those described for the DCI case.

In yet another example, the UE is indicated to provide a number of CSI reports via RRC information. The UE assumes the number of multiple CSI reports is valid until deactivated by higher layers.

FIG. 15 illustrates a diagram 1500 of an example for a configuration of multiple CSI reports according to multiple hypotheses for CSI reporting according to embodiments of the present disclosure. The embodiment of the diagram 1500 illustrated in FIG. 15 is for illustration only. FIG. 15 does not limit the scope of this disclosure to any particular implementation.

A configuration for a number of CSI reports corresponding to a set of SD/PD configurations for a serving cell can include a period and a time offset as illustrated in FIG. 15. The configuration can be applicable to a periodic or a semi-persistent CSI report. A UE (e.g., 113) can be provided for serving cell, by CSI-reportConfig, a periodicity and a slot offset, for example via reportSlotConfig, for periodic or semi-persistent CSI reports for CSI reports corresponding to a current SD/PD configuration on a serving cell and, in addition, the UE (e.g., 113) can be provided a periodicity and a slot offset for a number of CSI reports corresponding to SD/PD adaptations on the serving cell. For example, if reportSlotConfig is set to 5 slots and a periodicity for the number of CSI reports is set to 1, the UE provides the number of CSI reports every 5 slots. As another example, if reportSlotConfig is set to 5 slots and the periodicity for the number of CSI reports is set to 2 with slot offset equal to 0, the UE alternates, per 5 slots, between providing the number of CSI reports and providing the CSI report for a current SD/PD configuration, starting with the number of CSI reports. An effective periodicity for each type of CSI report is 10 slots. In another example, if reportSlotConfig is set to 10 slots and the periodicity for the number of CSI reports is set to 3 with slot offset 1, the UE provides the number of CSI reports on the $2^{nd}$, $5^{th}$, $8^{th}$ . . . reporting instances for a resulting periodicity of 30 slots. In yet another example, the UE is provided a CSI-reportConfig_adapt, for parameters related to providing the number of CSI reports for an indicated set of SD/PD configurations, that is separate from CSI-reportConfig.

A UE (e.g., UE 113) can provide CQI reports associated with a number of hypotheses for SD/PD configurations, in a standalone manner, for example based on a separate configuration for corresponding CSI reports such as by parameter CSI-reportConfig_adapt. A CQI value for a first SD/PD hypothesis can be an absolute value, independent of a CQI value for a second SD/PD hypothesis, or can be a differential value where, if a CQI index for the first hypothesis is $c_1$ and a CQI index for the second hypothesis is $c_2$, the CQI for the second hypothesis can be reported in a differential manner, i.e., $c_2$-$c_1$. For more than two reports, the $n^{th}$ CQI index for the $n^{th}$ SD/PD hypothesis can be reported in a differential manner to the CQI index for the first SD/PD hypothesis or for the $n-1^{th}$ SD/PD hypothesis. In yet another example, the UE provides the CQI index for the $n^{th}$ hypothesis other than the first hypothesis only when the differential CQI index, either relative to the first CQI value or to the $n-1^{th}$ CQI value, is greater than a threshold value; otherwise, the UE does not report the CQI value. In this case, the UE can include a bitmap indicating the hypotheses indexes for which a number of CSI report are sent. In yet another example, a UE is indicated a second number of CQI values to provide for a first number of hypotheses, where the second number is smaller than or equal to the first number. The second number of CQI values can be the larger CQI values from the first number of CQI values and then the UE also reports a second number of indexes for the corresponding hypotheses.

For reporting RI values, or for reporting L1-RSRP, for multiple hypotheses, methods similar to reporting CQI values for multiple hypotheses can apply.

PMI reports for multiple hypotheses can be reported in a standalone manner. In another example, if the codebook configuration, i.e., the codebook type and the 2D antenna structure, for the first hypothesis and for the second hypothesis share a same structure, a PMI feedback for the second hypothesis can be based on the basis set the UE reports for the first hypothesis and the UE reports only amplitude/phase coefficients for the second hypothesis. In yet another example, the PMI for the second hypothesis reuses the basis set from the first hypothesis and the amplitude/phase coefficients are reported relative to the coefficients for the first hypothesis, i.e., using differential values. In yet another example, a UE reports a PMI for a second hypothesis only when a measure of a distance from a PMI for a first hypothesis, such as a normalized mean square error (NMSE), cosine similarity, L-norm, is greater than a threshold value that can be indicated to the UE by higher layers. Otherwise, the UE does not report PMI for the second hypothesis. In yet another example, the gNB indicates to the UE hypotheses indexes, other than the one for the first hypothesis, for the UE to provide respective PMI reports.

When a UE multiplexes several UCI types in a PUCCH, a number of REs for the UCI multiplexing in the PUCCH may not be sufficient for a resulting code rate to be smaller than or equal to a code rate the UE is indicated by L1 or higher layers. Then, in order to reduce a code rate, the UE can drop some of the UCI. In case the UE reports multiple CSIs associated with multiple candidate SD/PD configurations, together with HARQ-ACK information or SR or CSI for a current SD/PD configuration, a priority for the multiple CSIs when the UE needs to drop some UCI needs to be defined. In one approach, the UE drops CSIs from the multiple CSIs sequentially, for example in a descending order of a corresponding index or all of the multiple CSIs, until a resulting code rate is smaller than or equal to the indicated code rate. In another approach, a priority order for the multiple CSIs is indicated to the UE by a serving gNB via higher layers. For example, the priority for reporting the multiple CSIs can be indicated to be larger than the priority for reporting the CSI for a current SD/PD configuration. For example, a first (indicated or specified) number of the multiple CSI reports can have larger priority than the CSI for a current SD/PD configuration and the remaining of the multiple CSI reports can have lower priority.

The DCI providing SD/PD adaptations can be UE-specific, UE-group-specific, or cell-specific. It is generally beneficial that a size of a DCI format providing SD/PD adaptation is small because a corresponding decoding reliability needs to be large. UEs that fail to detect a DCI format providing SD/PD adaptation may not operate under a correct SD/PD configuration for communicating with a serving gNB and that can result to poor quality of serving and create problems to the overall network operation. If UE-group specific or cell-specific DCI format is used to provide SD/PD adaptation, it needs to be received by a number of UEs within the serving cell. Therefore, it is appropriate for PDCCH monitoring for detection of the DCI format providing SD/PD adaptation to be according to one or more CSS sets and for a CRC of the DCI format to be scrambled by a dedicated RNTI such as NES-RNTI. The size of the DCI format providing SD/PD adaptation can be different, possibly smaller, than the sizes of other DCI formats that UEs can be configured to monitor according to CSS sets, such as for example a DCI format 2_0 used for indicating slot format to a group of UEs. Therefore, a UE design constraint for maintaining a "3+1" limit for sizes of DCI formats that the UE can decode from PDCCH receptions per cell needs to be addressed when the UE also decodes DCI format providing SD/PD adaptation for PDCCH receptions on a cell.

In one embodiment, a size of DCI format providing SD/PD adaptation can be different from sizes of other DCI formats that a UE monitors corresponding PDCCHs on a same cell. Then, in order to maintain a "3+1" limit for sizes of DCI formats for the cell, a UE may need to perform additional size matching for DCI formats the UE receives corresponding PDCCHs for the cell where the UE receives PDCCHs that provide DCI format for providing SD/PD adaptation. That would lead to increased size for some of the DCI formats as size matching between two DCI formats is by padding zeroes to one of the DCI formats that has smaller size.

In another embodiment, to avoid a potential increase for sizes of other DCI formats, a size of the DCI format providing SD/PD adaptation can be defined by the specifications of the system operation to be same as a size of an existing DCI format such as DCI format 0_0 or 1_0. The DCI format sending SD/PD adaptation can be provided by PDCCH receptions according to CSS sets in the active DL BWP of a UE, or in the initial DL BWP if PDCCH receptions for the corresponding DCI format are only in the initial DL BWP. For example, DCI format 1_0 can be used to schedule PDSCH providing SIBs, or random-access response, or paging, or, when the CRC is scrambled by a C-RNTI, schedule UE-specific PDSCH. For a typical DCI format 1_0 size of about 40 bits, excluding CRC, a serving gNB can indicate a size of the fields, and if the total size of the DCI format providing SD/PD adaptation is smaller than the size of DCI format 1_0, the UE can pad bits to the DCI format providing SD/PD adaptation, such as bits with value of 0, until a size of the DCI format providing SD/PD adaptation is same as a size of DCI format 1_0 provided by PDCCHs that the UE monitors according to CSS sets.

In further embodiments, instead of being specified to be the same as the size of DCI format 1_0 provided by PDCCHs that a UE monitors according to CSS sets, a size of the DCI format providing SD/PD adaptation can be separately indicated to a UE by a serving gNB through higher layer signaling, such as through a SIB or through UE-specific RRC signaling (e.g., RRC message). The third approach provides flexibility to a serving gNB compared to the second approach at the expense of marginal signaling overhead. For example, if sizes of other DCI formats that a UE monitors corresponding PDCCHs according to CSS sets are smaller than a size of DCI format 1_0 that the UE monitors corresponding PDCCHs according to CSS sets, the serving gNB can indicate one of the sizes of the other DCI formats. For example, if search space sets indicated to UE by the serving gNB are such that associated sizes of DCI formats are less than the "3+1" limit, the DCI format providing CEI can have any size without requiring size matching for the other DCI formats. The indication of the size of the DCI format providing CEI can be optional. If provided, a UE appends zeroes to the bits of the fields in the DCI format providing SD/PD adaptation until a size is same as the indicated size. If not provided, a UE determines a size of the DCI format providing SD/PD adaptation based on a total number of bits for the fields of the DCI format.

FIG. 16 illustrates a flowchart of a method 1600 for a UE to apply SD/PD adaptation indicated by DCI according to embodiments of the present disclosure. The embodiment of the flowchart of method 1600 illustrated in FIG. 16 is for illustration only. FIG. 16 does not limit the scope of this disclosure to any particular implementation.

At 1610, a UE (e.g., UE 116) is provided from a serving gNB (e.g., gNB 102) by a higher layer signaling PDCCH monitoring configuration for DCI providing SD/PD adaptations including but not limited to CSI resource/report adaptations and an application time after receiving the DCI. As exemplified for FIG. 12, a UE can be provided from the serving cell via DCI various information related to SD/PD adaptations such as an update to CSI-RS resource configuration, codebook configuration, CSI-RS to SSB power offset, or CSI-RS to PDSCH power offset. The DCI providing SD/PD adaptations can be UE-specific, UE-group-specific, or cell-specific. For UE-specific DCI, the UE can be indicated to monitor PDCCH according to a CSS set or a USS set. For UE-group-specific or cell-specific DCI, the UE can be indicated to monitor PDCCH according to a CSS set, e.g., Type 2 or Type 3 CSS. The search space configuration can be provided to the UE as a part of PDCCH-Config, PDCCH-ConfigCommon or DownlinkConfigCommonSIB.

The UE is also provided from the serving gNB an application time of the indicated SD/PD adaptation after receiving the DCI. The application time can be in units of symbols or slots based on the current or smallest SCS of the active BWP, which is applied with respect to a certain reference timing. As an example, the reference timing can be a time at which the UE received PDCCH providing DCI indicating SD/PD adaptation. As another example, the reference timing can be the last symbol of the acknowledgement of the DCI indicating SD/PD adaptation. When the UE would transmit a PUCCH with HARQ-ACK information or a PUSCH with HARQ-ACK information corresponding to the DCI carrying the SD/PD adaptation and without DL assignment, or corresponding to the PDSCH scheduled by the DCI carrying the SD/PD indication, and if the indicated SD/PD parameter is different from the previously indicated one, the indicated SD/PD adaptation should be applied starting from the first slot that is at least 'application time' symbols after the last symbol of the PUCCH or the PUSCH. The first slot and the 'application time' symbols are both determined on the active BWP with the current SCS of the active BWP or smallest SCS among the active BWP(s) of the carrier(s) applying the SD/PD adaptation indication.

At 1620, the UE monitors PDCCH for DCI providing SD/PD adaptations. At 1630, if a DCI providing SD/PD adaptations is detected, the UE applies indicated SD/PD adaptations after the application time.

Any of the above variation embodiments can be utilized independently or in combination with at least one other variation embodiment.

The above flowcharts illustrate example methods that can be implemented in accordance with the principles of the present disclosure and various changes could be made to the methods illustrated in the flowchart herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the descriptions in this application should be read as implying that any particular element, step, or function is an essential element that must be included in the claims scope. The scope of patented subject matter is defined by the claims.

What is claimed is:

1. A method for a user equipment (UE) to report channel state information (CSI), the method comprising:
   receiving:
      first information related to reception of one or more non-zero power CSI reference signals (NZP CSI-RSs) on a cell,
      second information related to determining a CSI report, wherein the second information includes:
         a set of parameters that commonly apply to a first number of CSI sub-reports, and
         a first number of sets of parameters to apply to the first number of CSI sub-reports, respectively, wherein the first number of sets of parameters are related to adaptations of the NZP CSI-RSs in one or more of power or spatial domains,
      third information related to indicating a second number of CSI sub-reports from the first number of CSI sub-reports,
      fourth information related to an uplink (UL) channel for transmitting the CSI report, and
      the one or more NZP CSI-RSs based on the first information;
   determining:
      the second number of CSI sub-reports based on the second information, the third information, and the reception of the one or more NZP CSI-RSs, and
      a third number of CSI sub-reports from the second number of CSI sub-reports based on the fourth information; and
   transmitting the UL channel with the CSI report including the third number of CSI sub-reports.

2. The method of claim 1, wherein:

the first number of sets of parameters provide information related to a CSI codebook for the first number of CSI sub-reports, respectively, a first set of parameters from the first number of sets of parameters indicates a single-panel CSI codebook type, and a second set of parameters from the first number of sets of parameters indicates a multi-panel CSI codebook type.

3. The method of claim 1, wherein the first number of sets of parameters provide, for the first number of CSI sub-reports, respectively, an offset value to power offset values of physical downlink shared channel (PDSCH) resource element (RE) to NZP CSI-RS RE of the one or more NZP CSI-RSs.

4. The method of claim 1, wherein:

the first number of sets of parameters provide information related to a CSI codebook for the first number of CSI sub-reports, respectively, and the information related to CSI codebook includes at least one of:

a number of antenna ports in a horizontal dimension, a number of antenna ports in a vertical dimension, a number of antenna panels, a codebook subset restriction, and a rank indication restriction.

5. The method of claim 1, wherein:

the set of parameters that commonly apply to the first number of CSI sub-reports, provided by the second information, indicates semi-persistent CSI reporting on a physical uplink control channel (PUCCH);

the third information provides indexes for the second number of CSI sub-reports from the first number of CSI sub-reports; and the third information is provided by a medium access control (MAC) control element (MAC CE) in a physical downlink shared channel (PDSCH) reception.

6. The method of claim 1, wherein:

the set of parameters that commonly apply to the first number of CSI sub-reports, provided by the second information, indicates aperiodic CSI reporting or semi-persistent CSI reporting on a physical uplink shared channel (PUSCH);

the third information is provided by:

a radio resource control (RRC) message in a physical downlink shared channel (PDSCH) reception providing one or more candidate sets of indexes for the second number of CSI sub-reports, and a downlink control information (DCI) format in a physical downlink control channel (PDCCH) reception, according to a UE-specific search space, indicating an index from the one or more candidate sets of indexes provided by RRC message in a PDSCH reception.

7. The method of claim 1, wherein:

the fourth information provides a maximum code rate for the UL channel, and determining the third number of CSI sub-reports further comprises:

determining, when UL control information (UCI) exceeds the maximum code rate, the third number of CSI sub-reports from the second number of CSI sub-reports by dropping a CSI sub-report in a descending order of a sub-report index from the second number of CSI sub-reports until the maximum code rate is met, and determining, when the UCI does not exceed the maximum code rate, the third number of CSI sub-reports from the second number of CSI sub-reports as equal to the second number of CSI sub-reports.

8. A user equipment (UE), comprising:

a transceiver configured to receive:

first information related to reception of one or more non-zero power channel state information reference signals (NZP CSI-RSs) on a cell, second information related to determining a channel state information (CSI) report, wherein the second information includes:

a set of parameters that commonly apply to a first number of CSI sub-reports, and a first number of sets of parameters to apply to the first number of CSI sub-reports, respectively, wherein the first number of sets of parameters are related to adaptations of the NZP CSI-RSs in one or more of power or spatial domains, third information related to indicating a second number of CSI sub-reports from the first number of CSI sub-reports, fourth information related to an uplink (UL) channel for transmitting the CSI report, and the one or more NZP CSI-RSs based on the first information; and a processor operably coupled to the transceiver, the processor configured to determine:

the second number of CSI sub-reports based on the second information, the third information, and the reception of the one or more NZP CSI-RSs, and a third number of CSI sub-reports from the second number of CSI sub-reports based on the fourth information, wherein the transceiver is further configured to transmit the UL channel with the CSI report including the third number of CSI sub-reports.

9. The UE of claim 8, wherein:

the first number of sets of parameters provide information related to a CSI codebook for the first number of CSI sub-reports, respectively, a first set of parameters from the first number of sets of parameters indicates a single-panel CSI codebook type, and a second set of parameters from the first number of sets of parameters indicates a multi-panel CSI codebook type.

10. The UE of claim 8, wherein the first number of sets of parameters provide, for the first number of CSI sub-reports, respectively, an offset value to power offset values of physical downlink shared channel (PDSCH) resource element (RE) to NZP CSI-RS RE of the one or more NZP CSI-RSs.

11. The UE of claim 8, wherein:

the first number of sets of parameters provide information related to a CSI codebook for the first number of CSI sub-reports, respectively, and the information related to CSI codebook includes at least one of:

a number of antenna ports in a horizontal dimension, a number of antenna ports in a vertical dimension, a number of antenna panels, a codebook subset restriction, and a rank indication restriction.

12. The UE of claim 8, wherein:

the set of parameters that commonly apply to the first number of CSI sub-reports, provided by the second information, indicates semi-persistent CSI reporting on a physical uplink control channel (PUCCH);

the third information provides indexes for the second number of CSI sub-reports from the first number of CSI sub-reports; and the third information is provided by a medium access control (MAC) control element (MAC CE) in a physical downlink shared channel (PDSCH) reception.

13. The UE of claim 8, wherein:

the set of parameters that commonly apply to the first number of CSI sub-reports, provided by the second information, indicates aperiodic CSI reporting or semi-persistent CSI reporting on a physical uplink shared channel (PUSCH);

the third information is provided by:

a radio resource control (RRC) message in a physical downlink shared channel (PDSCH) reception providing one or more candidate sets of indexes for the second number of CSI sub-reports, and a downlink control information (DCI) format in a physical downlink control channel (PDCCH) reception, according to a UE-specific search space, indicating an index from the one or more candidate sets of indexes provided by RRC message in a PDSCH reception.

14. The UE of claim 8, wherein:

the fourth information provides a maximum code rate for the UL channel, the processor is further configured to:

determine, when UL control information (UCI) exceeds the maximum code rate, the third number of CSI sub-reports from the second number of CSI sub-reports by dropping a CSI sub-report in a descending order of a sub-report index from the second number of CSI sub-reports until the maximum code rate is met, and determine, when the UCI does not exceed the maximum code rate, the third number of CSI sub-reports from the second number of CSI sub-reports as equal to the second number of CSI sub-reports.

15. A base station (BS), comprising:

a processor; and a transceiver operably coupled to the processor, the transceiver configured to:

transmit:

first information related to transmission of one or more non-zero power channel state information reference signals (NZP CSI-RSs) on a cell, second information related to determining a channel state information (CSI) report, wherein the second information includes:

a set of parameters that commonly apply to a first number of CSI sub-reports, and a first number of sets of parameters to apply to the first number of CSI sub-reports, respectively, wherein the first number of sets of parameters are related to adaptations of the NZP CSI-RSs in one or more of power or spatial domains, third information related to indicating a second number of CSI sub-reports from the first number of CSI sub-reports, fourth information related to an uplink (UL) channel for the CSI report, and the one or more NZP CSI-RSs based on the first information; and receive the UL channel with the CSI report including a third number of CSI sub-reports, wherein the third number of CSI sub-reports are from the second number of CSI sub-reports based on the fourth information, and wherein the second number of CSI sub-reports are based on the second information, the third information, and the one or more NZP CSI-RSs.

16. The BS of claim 15, wherein:

the first number of sets of parameters provide information related to a CSI codebook for the first number of CSI sub-reports, respectively, a first set of parameters from the first number of sets of parameters indicates a single-panel CSI codebook type, and a second set of parameters from the first number of sets of parameters indicates a multi-panel CSI codebook type.

17. The BS of claim 15, wherein the first number of sets of parameters provide, for the first number of CSI sub-reports, respectively, an offset value to power offset values of physical downlink shared channel (PDSCH) resource element (RE) to NZP CSI-RS RE of the one or more NZP CSI-RSs.

18. The BS of claim 15, wherein:

the first number of sets of parameters provide information related to a CSI codebook for the first number of CSI sub-reports, respectively, and the information related to CSI codebook includes at least one of:

a number of antenna ports in a horizontal dimension, a number of antenna ports in a vertical dimension, a number of antenna panels, a codebook subset restriction, and a rank indication restriction.

19. The BS of claim 15, wherein:

the set of parameters that commonly apply to the first number of CSI sub-reports, provided by the second information, indicates semi-persistent CSI reporting on a physical uplink control channel (PUCCH);

the third information provides indexes for the second number of CSI sub-reports from the first number of CSI sub-reports; and the third information is provided by a medium access control (MAC) control element (MAC CE) in a physical downlink shared channel (PDSCH) transmission.

20. The BS of claim 15, wherein:

the set of parameters that commonly apply to the first number of CSI sub-reports, provided by the second information, indicates aperiodic CSI reporting or semi-persistent CSI reporting on a physical uplink shared channel (PUSCH);

the third information is provided by:

a radio resource control (RRC) message in a physical downlink shared channel (PDSCH) transmission providing one or more candidate sets of indexes for the second number of CSI sub-reports, and a downlink control information (DCI) format in a physical downlink control channel (PDCCH) transmission, according to a UE-specific search space, indicating an index from the one or more candidate sets of indexes provided by RRC message in a PDSCH transmission.

* * * * *